US010536941B2

(12) United States Patent
Li et al.

(10) Patent No.: US 10,536,941 B2
(45) Date of Patent: Jan. 14, 2020

(54) DATA TRANSMISSION METHOD AND SYSTEM, AND DEVICE HAVING BASE STATION FUNCTION

(71) Applicant: Yulong Computer Telecommunication Scientific (Shenzhen) Co., Ltd., Shenzhen, Guangdong (CN)

(72) Inventors: Mingju Li, Guangdong (CN); Yajun Zhu, Guangdong (CN); Yunfei Zhang, Guangdong (CN)

(73) Assignee: Nanchang Coolpad Intelligent Technology Company Limited, Nanchang (CN)

( * ) Notice: Subject to any disclaimer, the term of this patent is extended or adjusted under 35 U.S.C. 154(b) by 108 days.

(21) Appl. No.: 15/358,364

(22) Filed: Nov. 22, 2016

(65) Prior Publication Data

US 2017/0079032 A1 Mar. 16, 2017

Related U.S. Application Data

(63) Continuation of application No. PCT/CN2014/087609, filed on Sep. 26, 2014.

(51) Int. Cl.
*H04W 72/04* (2009.01)
*H04W 74/08* (2009.01)
(Continued)

(52) U.S. Cl.
CPC ......... *H04W 72/0446* (2013.01); *H04L 5/005* (2013.01); *H04L 5/14* (2013.01); *H04W 72/0453* (2013.01); *H04W 74/0816* (2013.01)

(58) Field of Classification Search
None
See application file for complete search history.

(56) References Cited

U.S. PATENT DOCUMENTS

2009/0067448 A1 3/2009 Stanwood et al.
2013/0208587 A1* 8/2013 Bala ...................... H04W 16/14 370/230
2014/0287769 A1 9/2014 Taori et al.

FOREIGN PATENT DOCUMENTS

CN 101090524 A 12/2007
CN 101631325 A 1/2010
(Continued)

OTHER PUBLICATIONS

Extended European search report issued in corresponding European application No. 14902740.1 dated Nov. 23, 2017.
(Continued)

*Primary Examiner* — Yemane Mesfin
*Assistant Examiner* — Jeff Banthrongsack
(74) *Attorney, Agent, or Firm* — Young Basile Hanlon & MacFarlane, P.C.

(57) ABSTRACT

Provided are a data transmission method and system for when an LTE system operates using a time division duplexing mode in an unlicensed frequency band, and a device having a base station function. The data transmission method comprises: a channel monitoring sub-frame used for periodically detecting a downlink channel state is arranged in a frame structure of a time division duplexing mode; within any period, if the channel monitoring sub-frame detects that a downlink channel is in idle state, downlink data is sent via a downlink sub-frame located within the period in the frame structure, and if not, downlink data is not sent within the period.

20 Claims, 7 Drawing Sheets

(51) Int. Cl.
*H04L 5/00* (2006.01)
*H04L 5/14* (2006.01)

(56) References Cited

FOREIGN PATENT DOCUMENTS

| | | | | |
|---|---|---|---|---|
| CN | 101925188 | A | | 12/2010 |
| EP | 3145264 | A | | 3/2017 |
| EP | 3145264 | A4 | * | 12/2017 |

OTHER PUBLICATIONS

"RP-1317-On LTE in Unlicensed Spectrum", 3GPP TSG-RAN Meeting #62, Nov. 6, 2013.

* cited by examiner

DATA TRANSMISSION METHOD AND SYSTEM, AND DEVICE HAVING BASE STATION FUNCTION

CROSS-REFERENCE TO RELATED APPLICATION(S)

This application is a continuation of International application PCT/CN2014/087609, filed Sep. 26, 2014 by YULONG COMPUTER TELECOMMUNICATION SCIENTIFIC (SHENZHEN) CO., LTD., the content of which is herein incorporated by reference in its entirety.

TECHNICAL FIELD

The present disclosure relates to communication technical field, particularly to a data transmission method and system for Long Term Evolution ("LTE" for short) system operating in an unlicensed frequency band of Time Division Duplex ("TDD" for short) mode, and a device having a base station function.

BACKGROUND

With the rapid increase in the amount of communication services, licensed spectrum of 3GPP (the 3rd Generation Partnership Project) is increasingly inadequate to provide higher network capacity. In order to further improve the utilization of spectrum resources, 3GPP is discussing how to use unlicensed spectrum, such as 2.4 GHz and 5 GHz frequency band, with the help of the licensed spectrum. Currently, the licensed spectrum is mainly used in Wi-Fi, Bluetooth, Radar, and medical and other systems.

Normally, access technology such as LTE designed for the licensed spectrum, which has high requirements on spectrum efficiency and user experience optimization, is not suitable for use in unlicensed frequency band. However, Carrier Aggregation ("CA" for short) function has made it possible to deploy LTE in the unlicensed spectrum. In addition, 3GPP has proposed LTE Assisted Access ("LAA" for short) concept, which can make use of the unlicensed spectrum with the aid of the licensed spectrum of LTE. For the unlicensed spectrum, there can be two working modes: 1) Supplemental Downlink ("SDL" for short) mode in which only downlink transmission sub-frame is involved; this mode can only be used with the aid of CA technology; 2) TDD mode in which both downlink sub-frame and uplink sub-frame are involved; this mode can be used with the aid of CA technology, Dual Connectivity ("DC" for short) technology, or can be used separately.

Compared with Wi-Fi system, LTE system operating in unlicensed frequency bands can provide higher spectral efficiency and greater coverage effect, and at the same time make data flow switch seamlessly between the licensed and unlicensed bands based on the same core network. For users, this means better broadband experience, a higher rate, and better stability and mobile convenience.

Access technology such as Wi-Fi for unlicensed spectrum has weak anti-interference ability. Wi-Fi system has designed a plurality of interference avoidance rules so as to avoid such interference, among which there is a Carrier Sense Multiple Access/Collision Detection ("CSMA/CD" for short) method. The basic principle of the CSMA/CD method is, before transmitting/receiving signaling or data, an Access Point ("AP" for short) or terminal will monitor and detect whether there is any other AP or terminal transmitting/receiving signaling or data around; if yes, the AP or terminal will keep on monitoring until no other AP or terminal is detected, otherwise, a random number will be generated as avoiding time. During the avoiding time, if no signaling or data transmission is detected, at the end of the backoff time, the AP or terminal will start to transmit signaling or data. The process is illustrated in FIG. 1.

In LTE network, since good orthogonality thereof can guaranty anti-interference performance, for downlink/uplink transmission between a base station and a user, there is no need to consider whether there is any other base station or user transmitting data. If the usage of other devices on the unlicensed frequency band is not considered when LTE is operating in the unlicensed frequency band, Wi-Fi equipment will be greatly disturbed. The reason is, since there is no monitoring rules in LTE, there will be transmission as long as there is business; thus, if there is LTE service transmission, Wi-Fi devices will need to wait for the LTE service transmission to complete and to detect an idle channel state for data transmission.

As can be seen, for LTE network, the most important key point when using unlicensed frequency band is to guaranty the coexistence of LAA and the existing access technology such as Wi-Fi. In traditional LTE system, there is no listen before talk ("LBT" for short) scheme to avoid collision.

Therefore, how to guaranty LTE system can operate normally in the unlicensed frequency band and at the same time avoid larger interference on other systems has become a problem to be solved.

SUMMARY

Taking into account at least one of above-mentioned issues, it is provided a novel data transmission scheme for an LTE system operating in an unlicensed frequency band based on TDD mode, which can guaranty LTE system can operate normally in the unlicensed frequency band and at the same time avoid larger interference on other systems, whereby the coexistence of LTE and the existing access technology in the unlicensed frequency band is achieved.

In view of this, the present disclosure provides a data transmission method for an LTE system operating in unlicensed frequency band based on Time Division Duplex ("TDD" for short) mode; this method is applicable to a device with base station function, and comprises: arranging a channel monitoring sub-frame used for periodically detecting downlink channel state in a frame structure of TDD mode; within any period, if the channel monitoring sub-frame detects that a downlink channel is in idle state, transmitting downlink data via a downlink sub-frame located within the any period in the frame structure, otherwise, do not transmitting downlink data within the any period.

In the technical scheme described above, by arranging the channel monitoring sub-frame used for detecting the downlink channel state in a frame structure of TDD mode, so as to transmit downlink data via the downlink sub-frame of the above frame structure upon detecting that the downlink channel is in the idle state and not transmit downlink data upon detecting that the downlink channel is in a busy state, whereby a corresponding interference avoidance mechanism can be adopted when the LTE system is operating in the unlicensed frequency band based on TDD mode, and coexistence with other systems such as Wi-Fi system operating in the unlicensed frequency band can be achieved. Normal operation of the LTE system in the unlicensed frequency band can be guaranteed, and larger interference on other systems which have interference avoiding mechanism due to the lack of interference avoiding mechanism of the LTE system can be avoided.

The data mentioned includes common interactive data and control signaling; the devices have base station function include base stations and microcells realized by means of communication devices such as smart phones.

Preferably, the channel monitoring sub-frame is arranged in at least one sub-frame of the frame structure. As a result, there is no need to arrange other additional sub-frames to carry the channel monitoring sub-frame in the frame structure of TDD mode; meanwhile, the channel monitoring sub-frame can be arranged in one or a plurality of sub-frames in the frame structure of TDD mode according to the actual situation of the LTE system. The arrangement location of the channel monitoring sub-frame can be one or more locations in an uplink sub-frame, a downlink sub-frame, or a special sub-frame.

Several preferred setting modes of the channel monitoring sub-frame is exemplified below.

Setting Mode 1

Based on setting mode 1, the channel monitoring sub-frame is arranged in an uplink sub-frame adjacent to a downlink sub-frame in the frame structure.

By arranging the channel monitoring sub-frame in the uplink sub-frame adjacent to the downlink sub-frame in the frame structure of TDD mode, detection of the downlink channel can be completed before the downlink transmission of the downlink sub-frame is started and after the uplink transmission of the uplink sub-frame is completed, and then it can be determined whether data transmission can be carried out via the downlink sub-frame. Besides, the downlink sub-frame is not occupied by the channel monitoring sub-frame and it can be used for downlink data transmission completely, whereby full use of the downlink sub-frame can be achieved.

Preferably, the channel monitoring sub-frame is arranged at the rear end of the uplink sub-frame and occupies a first predetermined number of symbols which is in a range from 1 to 14.

By arranging the channel monitoring sub-frame at the rear end of the uplink sub-frame, timeliness of channel detection can be guaranteed. Thus, the channel state detected prior to downlink data transmission is the latest status, whereby effects on the downlink data transmission due to channel state change that occurs when the downlink data is to be transmitted can be avoided, wherein the channel state change occurs because the channel detection is earlier and the downlink data transmission is late.

Specially, suppose the channel detection is earlier and it is detected that the channel is busy; since the downlink data transmission is relatively late, that is to say, the channel monitoring sub-frame is far away from the downlink sub-frame, the channel may be in the idle state when the downlink data is to be transmitted. The LTE system will not carry out downlink data transmission but wait for the next channel detection because the detecting result is that the channel is busy, as a result, the downlink data cannot be transmitted. Similarly, suppose the channel detection is earlier and it is detected that the channel is in the idle state; since the downlink data transmission is relatively late, the channel may become busy when the downlink data is to be transmitted even though the detecting result is that the channel is idle, at this time, the LTE system will transmit downlink data without waiting for the next channel detection, and this will cause interference on other systems.

Setting Mode 2

Based on setting mode 2, the channel monitoring sub-frame is arranged in a downlink sub-frame adjacent to an uplink sub-frame in the frame structure.

By arranging the channel monitoring sub-frame in the downlink sub-frame adjacent to the uplink sub-frame in the frame structure of TDD mode, measurements of the downlink channel can be carried out in time if downlink transmission is required. Meanwhile, the uplink sub-frame is not occupied by the channel monitoring sub-frame and it can be used for uplink data transmission completely, whereby full use of the uplink sub-frame can be achieved.

Preferably, the channel monitoring sub-frame is arranged at the front end of the downlink sub-frame and occupies a second predetermined number of symbols which is in a range from 1 to 14.

By arranging the channel monitoring sub-frame at the front end of the downlink sub-frame, the rest of the downlink sub-frame will continue to be utilized for the downlink data transmission, which ensures full utilization of the downlink sub-frame.

Setting Mode 3

Based on setting mode 3, the channel monitoring sub-frame is arranged in a special sub-frame in the frame structure.

By arranging the channel monitoring sub-frame in the special sub-frame, there is no need to occupy the downlink sub-frame and the uplink sub-frame, therefore the uplink transmission and the downlink transmission of the system will not be affected. On the same carrier frequency, if the channel monitoring sub-frame is arranged in the special sub-frame and to the same location of the frame structure respectively by different base stations of the same operator, a base station of another operator will be taken as a reference when the different base stations detecting channel state, and the channel will not be deemed as busy even though a base station signal of the same operator is detected.

Preferably, the channel monitoring sub-frame is arranged at a location adjacent to Uplink Pilot Time Slot (UpPTS) in the special sub-frame and occupies a third predetermined number of symbols which is in a range from 1 to 9.

In the frame structure of TDD mode, it is required to set GP when the downlink sub-frame switching to the uplink sub-frame. The channel monitoring sub-frame needs to monitor an uplink signal to detect the channel state. By arranging the channel monitoring sub-frame to the location adjacent to UpPTS, that is, between UpPTS and GP or after UpPTS, compared with the situation where the channel monitoring sub-frame is arranged before UpPTS or between DwPTS and GP, there is no need to set an additional GP.

The minimum number of symbols occupied by UpPTS or GP is 1 symbol, and the minimum number of symbols occupied by DwPTS is 3 symbols; since 14 symbols are included in one sub-frame, the maximum number of symbols occupied by the channel monitoring sub-frame arranged in the special sub-frame is 9 symbols, and the minimum number thereof is 1 symbol.

The channel monitoring sub-frame can detect the downlink channel state as follows: determining that the downlink channel is in the idle state if it is detected in each symbol occupied by the channel monitoring sub-frame that the downlink channel is in the idle state, otherwise, the downlink channel is in non-idle state.

In this technical scheme, the detection is performed once every symbol by the channel monitoring sub-frame, thus, the downlink channel can be determined to be in the idle state if it is detected in each symbol occupied by the channel monitoring sub-frame that the downlink channel is in the idle state.

The number of the symbols occupied by the channel monitoring sub-frame can be set as follows: during the operation of the LTE system, the number of the symbols occupied by the channel monitoring sub-frame is fixed; or, during the operation of the LTE system, detecting a channel condition change rate of other systems using the unlicensed frequency band around the LTE system in real time, and setting the number of symbols occupied by the channel monitoring sub-frame dynamically according to the channel condition change rate detected in-real time and/or the channel detecting ability of the device with base station function.

Specifically, the channel condition change rate of the other systems is in direct proportion to the number of symbols occupied by the channel monitoring sub-frame; the channel detecting ability of the device with base station function is in inverse proportion to the number of symbols occupied by the channel monitoring sub-frame.

As can be seen, in the technical scheme described above, the number of symbols occupied by the channel monitoring sub-frame can be fixed, or can be adjusted according to the actual situation during the operation of the LET system. In the latter case, in order to measure the downlink channel state precisely, if the channel condition change rate of the other systems using the unlicensed frequency band around the LTE system is relatively fast, multiple measurement of the downlink channel state will be needed, that is, the number of symbols occupied by the channel monitoring sub-frame is set to be larger. Similarly, if the LTE system has poor channel detecting ability, multiple measurement of the downlink channel state will be needed either, that is, the number of symbols occupied by the channel monitoring sub-frame is set to be larger. Thus, the channel condition change rate of the other systems is in direct proportion to the number of symbols occupied by the channel monitoring sub-frame; the channel detecting ability of the device with base station function is in inverse proportion to the number of symbols occupied by the channel monitoring sub-frame.

Period of the channel monitoring sub-frame can be set in one of the following mode.

Setting Mode 1

In setting mode 1, the period of the channel monitoring sub-frame is set according to the number of downlink sub-frames included in each switch point period in the frame structure.

Specifically, if there are fewer downlink sub-frames included in each switch point period of the frame structure, such as for Configuration 0, Configuration 3, and Configuration 6, the period of the channel monitoring sub-frame can be set to be longer; in contradistinction, if there are relatively more sub-frames included in each switch point, the period of the channel monitoring sub-frame can be set to be shorter in order to determine whether to transmit downlink data according to the real-time state of the downlink channel.

As an example, for Configuration 0, Configuration 3, and Configuration 6 of the configuration mode of the frame structure, the period of the channel monitoring sub-frame is M*10 ms, and M is a positive integer; for Configuration 1, Configuration 2, Configuration 4, and Configuration 5 of the configuration mode of the frame structure, the period of the channel monitoring sub-frame is N*5 ms, and N is 1 or a positive even number.

If the period of the channel monitoring sub-frame is 5 ms, two locations in the frame structure will be required to arrange the channel monitoring sub-frame. The two locations can be either the same sub-frame location or different sub-frame locations. For example, for Configuration 5, if the period of the channel monitoring sub-frame is 5 ms, channel monitoring sub-frames can be set at the location of Sub-frame #1 (that is, Sub-frame S) and the location of Sub-frame #6 (that is, Sub-frame D) respectively, in other words, two channel monitoring sub-frames in the same frame structure are in locations of different sub-frame types. As another example, for Configuration 1, if the period of the channel monitoring sub-frame is 5 ms, channel monitoring sub-frames can be set at the location of Sub-frame #1 (that is, Sub-frame S) and the location of Sub-frame #6 (that is, Sub-frame S) respectively, in other words, two channel monitoring sub-frames in the same frame structure are in locations of the same sub-frame type.

Preferably, the method further comprises: if there are multiple locations available for arranging the channel monitoring sub-frame in the frame structure and the period of the channel monitoring sub-frame is M*10 ms, selecting the first location from the multiple locations to arrange the channel monitoring sub-frame.

Specifically, for Configuration 1, the channel monitoring sub-frame can be arranged at the location of Sub-frame #1 (that is, Sub-frame S) and the location of Sub-frame #6 (that is, Sub-frame S) respectively; if the period of the channel monitoring sub-frame is an integral multiple of 10 ms, the channel monitoring sub-frame can be set at the location of Sub-frame#1 only.

Setting Mode 2

In setting mode 2, during the operation of the LTE system, a load state change rate of the LTE system and a load state change rate of the other systems using the unlicensed frequency band around the LTE system will be detected in real time, and the period of the channel monitoring sub-frame will be set dynamically according to the load state change rate of the LTE system and the load state change rate of the other systems detected in real time.

Preferably, the load state change rate of the LTE system is in inverse proportion to the period of the channel monitoring sub-frame; the load state change rate of the other systems is in inverse proportion to the period of the channel monitoring sub-frame.

In this technical scheme, by setting the period of the channel monitoring sub-frame dynamically according to the load state change rate of the LTE system and/or the load state change rate of the other systems detected in real time, the period of the channel monitoring sub-frame can be more consistent with the working state of the LTE system. Specifically, the greater the load state change rate of the LTE system, the greater the transmission quantity change of the downlink data; the greater the load state change rate of the other systems, the greater the channel state change. Thus, in order to transmit downlink data, the channel state should be detected in short time intervals, that is, the period of the channel monitoring sub-frame should be set to be shorter.

In practice, the period of the channel monitoring sub-frame can be set based on any one or a combination of the setting mode described above.

Preferably, the method further includes: determining whether or not downlink service needs to be processed; if yes, detecting the downlink channel state via the channel monitoring sub-frame in the frame structure.

Specifically, the detection of the downlink channel state via the channel monitoring sub-frame by the base station can be carried out only if it is determined that there is downlink service; or, can be carried out all the way regardless of the existence of the downlink service.

The method can further includes: determining whether the device with base station function and other devices with base station function belong to the same operator; if yes, proceed to step a, that is, setting the location of the channel monitoring sub-frame in the frame structure of the device with base station function and the location of the channel monitoring sub-frame in the frame structure of the other devices with base station function to be the same on the same carrier frequency; otherwise, proceed to step b, that is, setting the location of the channel monitoring sub-frame in the frame structure of the device with base station function and the location of the channel monitoring sub-frame in the frame structure of the other devices with base station function to be different on the same carrier frequency.

In this technical scheme, the purpose of channel detection is to detect whether a base station (or a device with base station function, the following takes the base station as an example for convenience of description, one skilled in the art should be noted that "base station" mentioned in this disclosure includes other devices with base station function) of other operators is using LAA, and whether the channel is occupied by Wi-Fi. Thus, for base stations belonging to the same operator, by configuring locations of channel monitoring sub-frames in the frame structure to be the same on the same carrier frequency, a determination that the channel is busy, which is caused by a mutual detection of signals among base stations belonging to the same operator, can be avoided; for base stations belonging to different operators, locations of channel monitoring sub-frames in the frame structure should be set to be different so as to detect whether the channel is occupied by base stations belonging to different operators.

Preferably, the above-mentioned step b comprises: determining whether the configuration mode of the frame structure of the device with base station function is the same with the configuration mode of the frame structure of the other devices with base station function on the same carrier frequency; and if yes, setting a relative offset between a sub-frame in the frame structure of the device with base station function and a sub-frame of the frame structure of the other devices with base station function.

As described in step b, if frame structures of base stations of different operators have the same configuration, a relative offset between the sub-frames of base stations will be set in order to make sure that the channel monitoring sub-frame can carry out measurement at different times. Of course, if there are multiple locations available for arranging the channel monitoring sub-frame in a frame structure, and if the frame structures of base stations of different operators are the same, the base stations of different operators can arrange the channel monitoring sub-frame at different locations in the frame structure.

According to another aspect of the disclosure, it is provided a data transmission system for an LTE system operating in unlicensed frequency band based on Time Division Duplex ("TDD" for short) mode, this system is applicable to a device with base station function, and comprises: a first arranging unit, configured to arrange a channel monitoring sub-frame used for periodically detecting downlink channel state in a frame structure of TDD mode; and a first processing unit, configured to transmit downlink data via a downlink sub-frame located within any period in the frame structure if the channel monitoring sub-frame detects that a downlink channel is in idle state within the any period, otherwise, not transmit downlink data within the any period.

In the technical scheme described above, by arranging the channel monitoring sub-frame used for detecting the downlink channel state in a frame structure of TDD mode, so as to transmit downlink data via the downlink sub-frame of the above frame structure upon detecting that the downlink channel is in the idle state and not transmit downlink data upon detecting that the downlink channel is in a busy state, whereby a corresponding interference avoidance mechanism can be adopted when the LTE system is operating in the unlicensed frequency band based on TDD mode, and coexistence with other systems such as Wi-Fi system operating in the unlicensed frequency band can be achieved. Normal operation of the LTE system in the unlicensed frequency band can be guaranteed, and larger interference on other systems which have interference avoiding mechanism due to the lack of interference avoiding mechanism of the LTE system can be avoided. The data mentioned includes common interactive data and control signaling; the devices have base station function include base stations and microcells realized by means of communication devices such as smart phones.

Preferably, the first arranging unit is configured to arrange the channel monitoring sub-frame in at least one sub-frame of the frame structure. As a result, there is no need to arrange other additional sub-frames to carry the channel monitoring sub-frame in the frame structure of TDD mode; meanwhile, the channel monitoring sub-frame can be arranged in one or a plurality of sub-frames in the frame structure of TDD mode according to the actual situation of the LTE system. The arrangement location of the channel monitoring sub-frame can be one or more locations in an uplink sub-frame, a downlink sub-frame, or a special sub-frame.

Several preferred setting modes of the channel monitoring sub-frame is exemplified below.

Setting Mode 1

Based on setting mode 1, the first arranging unit is configured to arrange the channel monitoring sub-frame to an uplink sub-frame adjacent to a downlink sub-frame in the frame structure.

By arranging the channel monitoring sub-frame in the uplink sub-frame adjacent to the downlink sub-frame in the frame structure of TDD mode, detection of the downlink channel can be completed before the downlink transmission of the downlink sub-frame is started and after the uplink transmission of the uplink sub-frame is completed, and then it can be determined whether data transmission can be carried out via the downlink sub-frame. Besides, the downlink sub-frame is not occupied by the channel monitoring sub-frame and it can be used for downlink data transmission completely, whereby full use of the downlink sub-frame can be achieved.

Preferably, the first arranging unit is further configured to arrange the channel monitoring sub-frame at the rear end of the uplink sub-frame; the channel monitoring sub-frame occupies a first predetermined number of symbols which is in a range from 1 to 14.

By arranging the channel monitoring sub-frame at the rear end of the uplink sub-frame, timeliness of channel detection can be guaranteed. Thus, the channel state detected prior to downlink data transmission is the latest status, whereby affects on the downlink data transmission due to channel state change that occurs when the downlink data is to be transmitted can be avoided, wherein the channel state change occurs because the channel detection is earlier and the downlink data transmission is late.

Specially, suppose the channel detection is earlier and it is detected that the channel is busy; since the downlink data transmission is relatively late, that is to say, the channel monitoring sub-frame is far away from the downlink subframe, the channel may be in the idle state when the downlink data is to be transmitted. The LTE system will not carry out downlink data transmission but wait for the next channel detection because the detecting result is that the channel is busy, as a result, the downlink data cannot be transmitted. Similarly, suppose the channel detection is earlier and it is detected that the channel is in the idle state; since the downlink data transmission is relatively late, the channel may become busy when the downlink data is to be transmitted even though the detecting result is that the channel is idle, at this time, the LTE system will transmit downlink data without waiting for the next channel detection, and this will cause interference on other systems.

Setting Mode 2

Based on setting mode 2, the first arranging unit is configured to arrange the channel monitoring sub-frame to a downlink sub-frame adjacent to an uplink sub-frame in the frame structure.

By arranging the channel monitoring sub-frame in the downlink sub-frame adjacent to the uplink sub-frame in the frame structure of TDD mode, measurements of the downlink channel can be carried out in time if downlink transmission is required. Meanwhile, the uplink sub-frame is not occupied by the channel monitoring sub-frame and it can be used for uplink data transmission completely, whereby full use of the uplink sub-frame can be achieved.

Preferably, the first arranging unit is further configured to arrange the channel monitoring sub-frame at the front end of the downlink sub-frame; the channel monitoring sub-frame occupies a second predetermined number of symbols which is in a range from 1 to 14.

By arranging the channel monitoring sub-frame at the front end of the downlink sub-frame, the rest of the downlink sub-frame will continue to be utilized for the downlink data transmission, which ensures full utilization of the downlink sub-frame.

Setting Mode 3

Based on setting mode 3, the first arranging unit is configured to arrange the channel monitoring sub-frame to a special sub-frame in the frame structure.

By arranging the channel monitoring sub-frame in the special sub-frame, there is no need to occupy the downlink sub-frame and the uplink sub-frame, therefore the uplink transmission and the downlink transmission of the system will not be affected. On the same carrier frequency, if the channel monitoring sub-frame is arranged in the special sub-frame by different base stations of the same operator respectively and at the same location of the frame structure, a base station of another operator will be taken as a reference when the different base stations detecting channel state, and the channel will not be deemed as busy even though a base station signal of the same operator is detected.

Preferably, the first arranging unit is configured to arrange the channel monitoring sub-frame to a location adjacent to UpPTS in the special sub-frame; the channel monitoring sub-frame occupies a third predetermined number of symbols which is in a range from 1 to 9.

In the frame structure of TDD mode, it is required to set GP when the downlink sub-frame switching to the uplink sub-frame. The channel monitoring sub-frame needs to monitor an uplink signal to detect the channel state. By arranging the channel monitoring sub-frame to the location adjacent to UpPTS, that is, between UpPTS and GP or after UpPTS, compared with the situation where the channel monitoring sub-frame is arranged before UpPTS or between DwPTS and GP, there is no need to set an additional GP.

The minimum number of symbols occupied by UpPTS or GP is 1 symbol, and the minimum number of symbols occupied by DwPTS is 3 symbols; since 14 symbols are included in one sub-frame, the maximum number of symbols occupied by the channel monitoring sub-frame arranged in the special sub-frame is 9 symbols, and the minimum number thereof is 1 symbol.

The channel monitoring sub-frame can detect the downlink channel state via the following configuration. The first arranging unit includes a determining unit, which is configured to determine that the downlink channel is in the idle state if it is detected in each symbol occupied by the channel monitoring sub-frame that the downlink channel is in the idle state, otherwise, determine that the downlink channel is in non-idle state.

In this technical scheme, the detection is performed once every symbol by the channel monitoring sub-frame, thus, the downlink channel can be determined to be in the idle state if it is detected in each symbol occupied by the channel monitoring sub-frame that the downlink channel is in the idle state.

The number of the symbols occupied by the channel monitoring sub-frame can be set via the following configuration. The system further includes a second arranging unit, which is configured to arrange the number of the symbols occupied by the channel monitoring sub-frame to be fixed during the operation of the LTE system. Alternatively, the system can further include: a first detecting unit, configured to detect a channel condition change rate of other systems using the unlicensed frequency band around the LTE system in real time during the operation of the LTE system, and a third arranging unit, configured to arrange the number of symbols occupied by the channel monitoring sub-frame dynamically according to the channel condition change rate detected in-real time by the first detecting unit and/or the channel detecting ability of the device with base station function.

Specifically, the channel condition change rate of the other systems is in direct proportion to the number of symbols occupied by the channel monitoring sub-frame; the channel detecting ability of the device with base station function is in inverse proportion to the number of symbols occupied by the channel monitoring sub-frame.

As can be seen, in the technical scheme described above, the number of symbols occupied by the channel monitoring sub-frame can be fixed, or can be adjusted according to the actual situation during the operation of the LET system. In the latter case, in order to measure the downlink channel state precisely, if the channel condition change rate of the other systems using the unlicensed frequency band around the LTE system is relatively fast, multiple measurement of the downlink channel state will be needed, that is, the number of symbols occupied by the channel monitoring sub-frame is set to be larger. Similarly, if the LTE system has poor channel detecting ability, multiple measurement of the downlink channel state will be needed either, that is, the number of symbols occupied by the channel monitoring sub-frame is set to be larger. Thus, the channel condition change rate of the other systems is in direct proportion to the number of symbols occupied by the channel monitoring sub-frame; the channel detecting ability of the device with base station function is in inverse proportion to the number of symbols occupied by the channel monitoring sub-frame.

Period of the channel monitoring sub-frame can be set in one of the following mode.

Setting Mode 1

In setting mode 1, the system further includes a fourth arranging unit, which is configured to set the period of the channel monitoring sub-frame according to the number of downlink sub-frames included in each switch point period in the frame structure.

Specifically, if there are fewer downlink sub-frames included in each switch point period of the frame structure, such as for Configuration 0, Configuration 3, and Configuration 6, the period of the channel monitoring sub-frame can be set to be longer; in contradistinction, if there are relatively more sub-frames included in each switch point, the period of the channel monitoring sub-frame can be set to be shorter in order to determine whether to transmit downlink data according to the real-time state of the downlink channel.

As one example, the fourth arranging unit is specifically configured to set the period of the channel monitoring sub-frame to be M*10 ms for Configuration 0, Configuration 3, and Configuration 6 of the configuration mode of the frame structure, M is a positive integer; and set the period of the channel monitoring sub-frame to be N*5 ms for Configuration 1, Configuration 2, Configuration 4, and Configuration 5 of the configuration mode of the frame structure, N is 1 or a positive even number.

If the period of the channel monitoring sub-frame is 5 ms, two locations in the frame structure will be required to arrange the channel monitoring sub-frame. The two locations can be either the same sub-frame location or different sub-frame locations. For example, for Configuration 5, if the period of the channel monitoring sub-frame is 5 ms, channel monitoring sub-frames can be set at the location of Sub-frame #1 (that is, Sub-frame S) and the location of Sub-frame #6 (that is, Sub-frame D) respectively, in other words, two channel monitoring sub-frames in the same frame structure are in locations of different sub-frame types. As another example, for Configuration 1, if the period of the channel monitoring sub-frame is 5 ms, channel monitoring sub-frames can be set at the location of Sub-frame #1 (that is, Sub-frame S) and the location of Sub-frame #6 (that is, Sub-frame S) respectively, in other words, two channel monitoring sub-frames in the same frame structure are in locations of the same sub-frame type.

Preferably, the first arranging unit is further configured to select a first location from multiple locations available for arranging the channel monitoring sub-frame to arrange the channel monitoring sub-frame if the multiple locations are included in the frame structure and the period of the channel monitoring sub-frame is M*10 ms.

Specifically, for Configuration 1, the channel monitoring sub-frame can be arranged at the location of Sub-frame #1 (that is, Sub-frame S) and the location of Sub-frame #6 (that is, Sub-frame S) respectively; if the period of the channel monitoring sub-frame is an integral multiple of 10 ms, the channel monitoring sub-frame can be set at the location of Sub-frame#1 only.

Setting Mode 2

In setting mode 2, the system can further include: a second detecting unit, configured to detect the load state change rate of the LTE system and the load state change rate of the other systems using the unlicensed frequency band around the LTE system in real time during the operation of the LTE system; and a fifth arranging unit, configured to set the period of the channel monitoring sub-frame dynamically according to the load state change rate of the LTE system and the load state change rate of the other systems detected in real time by the second detecting unit.

Preferably, the load state change rate of the LTE system is in inverse proportion to the period of the channel monitoring sub-frame; the load state change rate of the other systems is in inverse proportion to the period of the channel monitoring sub-frame.

In this technical scheme, by setting the period of the channel monitoring sub-frame dynamically according to the load state change rate of the LTE system and/or the load state change rate of the other systems detected in real time, the period of the channel monitoring sub-frame can be more consistent with the working state of the LTE system. Specifically, the greater the load state change rate of the LTE system, the greater the transmission quantity change of the downlink data; the greater the load state change rate of the other systems, the greater the channel state change. Thus, in order to transmit downlink data, the channel state should be detected in short time intervals, that is, the period of the channel monitoring sub-frame should be set to be shorter.

In practice, the period of the channel monitoring sub-frame can be set based on any one or a combination of the setting mode described above.

Preferably, the system further includes a first judging unit, which is configured to judge whether or not downlink service needs to be processed; and the first processing unit is configured to detect the downlink channel state via the channel monitoring sub-frame in the frame structure if the result of the first judging unit is yes.

Specifically, the detection of the downlink channel state via the channel monitoring sub-frame by the base station can be carried out only if it is determined that there is downlink service; or, can be carried out all the way regardless of the existence of the downlink service.

The system can still include: a second judging unit, configured to judge whether the device with base station function and other devices with base station function belong to the same operator; a second processing unit, configured to set the location of the channel monitoring sub-frame in the frame structure of the device with base station function and the location of the channel monitoring sub-frame in the frame structure of the other devices with base station function to be the same on the same carrier frequency if the result of the second judging unit is yes, and otherwise, set the location of the channel monitoring sub-frame in the frame structure of the device with base station function and the location of the channel monitoring sub-frame in the frame structure of the other devices with base station function to be different on the same carrier frequency.

In this technical scheme, the purpose of channel detection is to detect whether a base station (or a device with base station function, the following takes "base station" as an example for convenience of description, one skilled in the art should be noted that "base station" mentioned in this disclosure includes other devices with base station function) of other operators is using LAA, and whether the channel is occupied by Wi-Fi. Thus, for base stations belonging to the same operator, by configuring locations of channel monitoring sub-frames in the frame structure to be the same on the same carrier frequency, a determination that the channel is busy, which is caused by a mutual detection of signals among base stations belonging to the same operator, can be avoided; for base stations belonging to different operators, locations of channel monitoring sub-frames in the frame structure should be set to be different so as to detect whether the channel is occupied by base stations belonging to different operators.

Preferably, the second processing unit includes: a third judging unit, configured to judge whether the configuration mode of the frame structure of the device with base station function is the same with the configuration mode of the frame structure of the other devices with base station function on the same carrier frequency if the result of the second judging unit is no; and a sixth arranging unit, configured to set a relative offset between a sub-frame in the frame structure of the device with base station function and a sub-frame of the frame structure of the other devices with base station function if the result of the third judging unit is yes.

In the technical scheme, if frame structures of base stations of different operators have the same configuration, a relative offset between the sub-frames of base stations will be set in order to make sure that the channel monitoring sub-frame can carry out measurement at different times. Of course, if there are multiple locations available for arranging the channel monitoring sub-frame in a frame structure, and if the frame structures of base stations of different operators are the same, the base stations of different operators can arrange the channel monitoring sub-frame at different locations in the frame structure.

According to a third aspect of the disclosure, it is provided a device with base station function, which includes the data transmission system for an LTE system operating in unlicensed frequency band based on Time Division Duplex in any technical scheme of the disclosure as described above.

With the aid of the technical schemes of this disclosure, normal operation of the LTE system in the unlicensed frequency band can be ensured, furthermore, significant interference with regard to other systems generated by the LTE system when operating in the unlicensed frequency band can be prevented, and therefore coexistence of the LTE system and the other systems in the unlicensed frequency band can be achieved.

DETAILED DESCRIPTION

In order to more clearly understand the above object, features, and advantages of the present disclosure, it will be described in further detail with refer to the accompanying drawings and the following implementations. It should be noted that, the implementations and the features thereof can be combined with each other without confliction.

In the following description, numerous specific details are set forth in order to fully understand the present disclosure, but the present disclosure can also be achieved in other ways different from the implementations described herein, therefore, the scope of the present disclosure is not limited to the following specific implementations.

In the first place, brief introduction of some basic concepts involved in this application will now be illustrated. "Sub-frame" referred to in this application includes Uplink sub-frame, down-link sub-frame, and special sub-frame. The special sub-frame includes Uplink Pilot Time Slot ("UpPTS" for short), Downlink Pilot Time Slot ("DwPTS" for short), and Guard Period ("GP" for short).

First Implementation

According to the first implementation of the disclosure, it is provided a data transmission method for an LTE system operating in unlicensed frequency band based on Time Division Duplex ("TDD" for short) mode. This method is applicable to a device with base station function.

Figure 1:
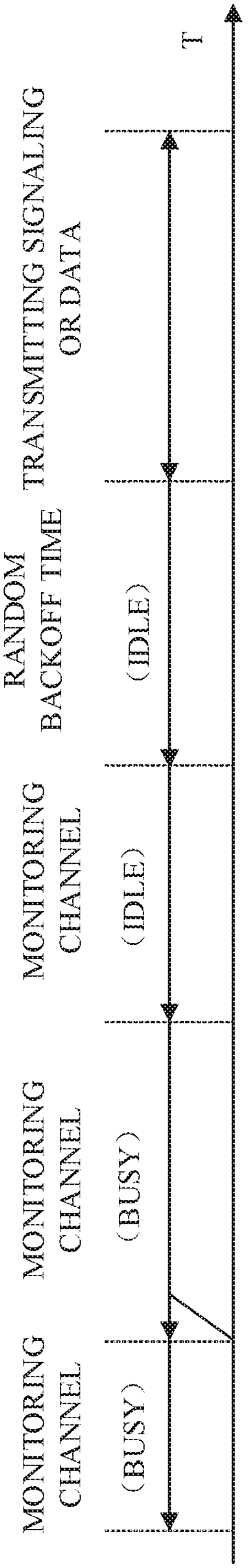
FIG. 1 is a schematic diagram illustrating an interference avoidance rule of a Wi-Fi system.
Figure 2:
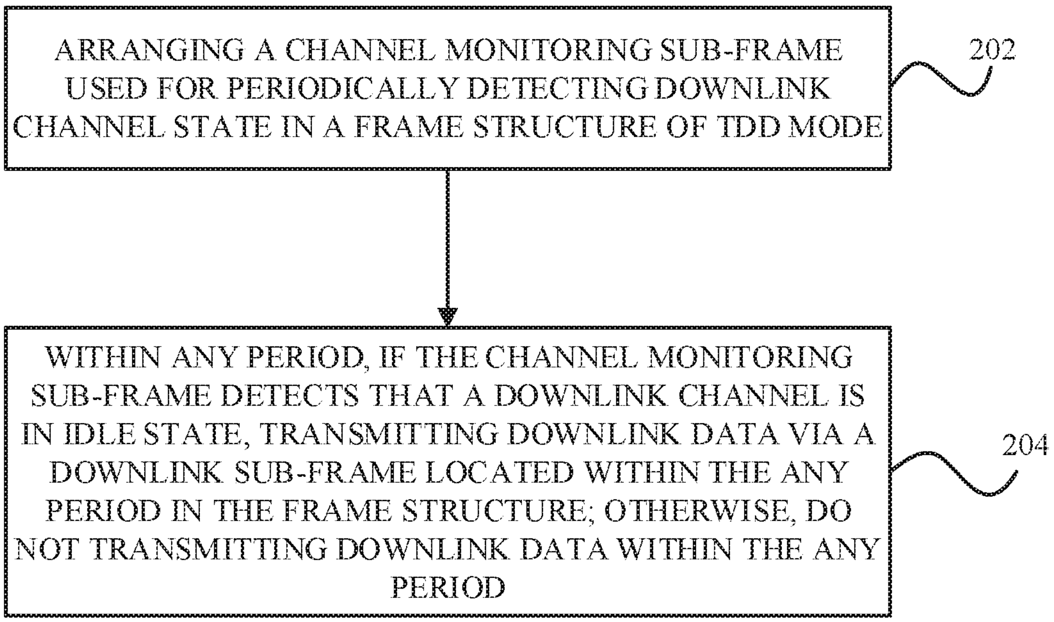
FIG. 2 is a flowchart illustrating a data transmission method for an LTE system operating in unlicensed frequency band based on Time Division Duplex ("TDD" for short) mode according to an implementation of the disclosure, the method is applicable to a device with base station function.

FIG. 2 is a flowchart illustrating the method, and as shown in FIG. 2, the method according to the first implementation of the disclosure includes step 202 and step 204, in which: step 202, arranging a channel monitoring sub-frame used for periodically detecting downlink channel state in a frame structure of TDD mode; and step 204, within any period, if the channel monitoring sub-frame detects that a downlink channel is in idle state, transmitting downlink data via a downlink sub-frame located within the any period in the frame structure, otherwise, do not transmitting downlink data within the any period.

In the technical scheme described above, by arranging the channel monitoring sub-frame used for detecting the downlink channel state in a frame structure of TDD mode, so as to transmit downlink data via the downlink sub-frame of the above frame structure upon detecting that the downlink channel is in the idle state and not transmit downlink data upon detecting that the downlink channel is in a busy state, whereby a corresponding interference avoidance mechanism can be adopted when the LTE system is operating in the unlicensed frequency band based on TDD mode, and coexistence with other systems such as Wi-Fi system operating in the unlicensed frequency band can be achieved. Normal operation of the LTE system in the unlicensed frequency band can be guaranteed, and larger interference on other systems which have interference avoiding mechanism due to the lack of interference avoiding mechanism of the LTE system can be avoided.

The data mentioned includes common interactive data and control signaling; the devices have base station function include base stations and microcells realized by means of communication devices such as smart phones.

Preferably, the channel monitoring sub-frame is arranged in at least one sub-frame of the frame structure. As a result, there is no need to arrange other additional sub-frames to carry the channel monitoring sub-frame in the frame structure of TDD mode; meanwhile, the channel monitoring sub-frame can be arranged in one or a plurality of sub-frames in the frame structure of TDD mode according to the actual situation of the LTE system. The arrangement location of the channel monitoring sub-frame can be one or more locations in an uplink sub-frame, a downlink sub-frame, or a special sub-frame.

Several preferred setting modes of the channel monitoring sub-frame is exemplified below.

Setting Mode 1

Based on setting mode 1, the channel monitoring sub-frame is arranged in an uplink sub-frame adjacent to a downlink sub-frame in the frame structure.

By arranging the channel monitoring sub-frame in the uplink sub-frame adjacent to the downlink sub-frame in the frame structure of TDD mode, detection of the downlink channel can be completed before the downlink transmission of the downlink sub-frame is started and after the uplink transmission of the uplink sub-frame is completed, and then it can be determined whether data transmission can be carried out via the downlink sub-frame. Besides, the downlink sub-frame is not occupied by the channel monitoring sub-frame and it can be used for downlink data transmission completely, whereby full use of the downlink sub-frame can be achieved.

Preferably, the channel monitoring sub-frame is arranged at the rear end of the uplink sub-frame and occupies a first predetermined number of symbols which is in a range from 1 to 14.

By arranging the channel monitoring sub-frame at the rear end of the uplink sub-frame, timeliness of channel detection can be guaranteed. Thus, the channel state detected prior to downlink data transmission is the latest status, whereby affects on the downlink data transmission due to channel state change that occurs when the downlink data is to be transmitted can be avoided, wherein the channel state change occurs because the channel detection is earlier and the downlink data transmission is late.

Specially, suppose the channel detection is earlier and it is detected that the channel is busy; since the downlink data transmission is relatively late, that is to say, the channel monitoring sub-frame is far away from the downlink sub-frame, the channel may be in the idle state when the downlink data is to be transmitted. The LTE system will not carry out downlink data transmission but wait for the next channel detection because the detecting result is that the channel is busy, as a result, the downlink data cannot be transmitted. Similarly, suppose the channel detection is earlier and it is detected that the channel is in the idle state; since the downlink data transmission is relatively late, the channel may become busy when the downlink data is to be transmitted even though the detecting result is that the channel is idle, at this time, the LTE system will transmit downlink data without waiting for the next channel detection, and this will cause interference on other systems.

Setting Mode 2

Based on setting mode 2, the channel monitoring sub-frame is arranged in the downlink sub-frame adjacent to the uplink sub-frame in the frame structure.

By arranging the channel monitoring sub-frame in the downlink sub-frame adjacent to the uplink sub-frame in the frame structure of TDD mode, measurements of the downlink channel can be carried out in time if downlink transmission is required. Meanwhile, the uplink sub-frame is not occupied by the channel monitoring sub-frame and it can be used for uplink data transmission completely, whereby full use of the uplink sub-frame can be achieved.

Preferably, the channel monitoring sub-frame is arranged at the front end of the downlink sub-frame and occupies a second predetermined number of symbols which is in a range from 1 to 14.

By arranging the channel monitoring sub-frame at the front end of the downlink sub-frame, the rest of the downlink sub-frame will continue to be utilized for the downlink data transmission, which ensures full utilization of the downlink sub-frame.

Setting Mode 3

Based on setting mode 3, the channel monitoring sub-frame is arranged in a special sub-frame in the frame structure.

By arranging the channel monitoring sub-frame in the special sub-frame, there is no need to occupy the downlink sub-frame and the uplink sub-frame, therefore the uplink transmission and the downlink transmission of the system will not be affected. On the same carrier frequency, if all channel monitoring sub-frames are arranged in the special sub-frame by different base stations of the same operator and at the same location of the frame structure, a base station of another operator will be taken as a reference when the different base stations detecting channel state, and the channel will not be deemed as busy even though a base station signal of the same operator is detected.

Preferably, the channel monitoring sub-frame is arranged at a location adjacent to UpPTS in the special sub-frame and occupies a third predetermined number of symbols which is in a range from 1 to 9.

In the frame structure of TDD mode, it is required to set GP when the downlink sub-frame switching to the uplink sub-frame. The channel monitoring sub-frame needs to monitor an uplink signal to detect the channel state. By arranging the channel monitoring sub-frame to the location adjacent to UpPTS, that is, between UpPTS and GP or after UpPTS, compared with the situation where the channel monitoring sub-frame is arranged before UpPTS or between DwPTS and GP, there is no need to set an additional GP.

The minimum number of symbols occupied by UpPTS or GP is 1 symbol, and the minimum number of symbols occupied by DwPTS is 3 symbols; since 14 symbols are included in one sub-frame, the maximum number of symbols occupied by the channel monitoring sub-frame arranged in the special sub-frame is 9 symbols, and the minimum number thereof is 1 symbol.

As an example, the channel monitoring sub-frame can detect the downlink channel state as follows: determining that the downlink channel is in the idle state if it is detected in each symbol occupied by the channel monitoring sub-frame that the downlink channel is in the idle state, otherwise, the downlink channel is in non-idle state.

In this technical scheme, the detection is performed once every symbol by the channel monitoring sub-frame, thus, the downlink channel can be determined to be in the idle state if it is detected in each symbol occupied by the channel monitoring sub-frame that the downlink channel is in the idle state.

As an example, the number of the symbols occupied by the channel monitoring sub-frame can be set as follows: during the operation of the LTE system, setting the number of the symbols occupied by the channel monitoring sub-frame to be fixed; or, during the operation of the LTE system, detecting a channel condition change rate of other systems using the unlicensed frequency band around the LTE system in real time, and setting the number of symbols occupied by the channel monitoring sub-frame dynamically according to the channel condition change rate detected in-real time and/or the channel detecting ability of the device with base station function.

Specifically, the channel condition change rate of the other systems is in direct proportion to the number of symbols occupied by the channel monitoring sub-frame; the channel detecting ability of the device with base station function is in inverse proportion to the number of symbols occupied by the channel monitoring sub-frame.

As can be seen, in the technical scheme described above, the number of symbols occupied by the channel monitoring sub-frame can be fixed, or can be adjusted according to the actual situation during the operation of the LET system. In the latter case, in order to measure the downlink channel state precisely, if the channel condition change rate of the other systems using the unlicensed frequency band around the LTE system is relatively fast, multiple measurement of the downlink channel state will be needed, that is, the number of symbols occupied by the channel monitoring sub-frame is set to be larger. Similarly, if the LTE system has poor channel detecting ability, multiple measurement of the downlink channel state will be needed either, that is, the number of symbols occupied by the channel monitoring sub-frame is set to be larger. Thus, the channel condition change rate of the other systems is in direct proportion to the number of symbols occupied by the channel monitoring sub-frame; the channel detecting ability of the device with base station function is in inverse proportion to the number of symbols occupied by the channel monitoring sub-frame.

Period of the channel monitoring sub-frame can be set in one of the following mode.

Setting Mode 1

In setting mode 1, the period of the channel monitoring sub-frame is set according to the number of downlink sub-frames included in each switch point period in the frame structure.

Specifically, if there are fewer downlink sub-frames included in each switch point period of the frame structure, such as for Configuration 0, Configuration 3, and Configuration 6, the period of the channel monitoring sub-frame can be set to be longer; in contradistinction, if there are relatively more sub-frames included in each switch point, the period of the channel monitoring sub-frame can be set to be shorter in order to determine whether to transmit downlink data according to the real-time state of the downlink channel.

As an example, for Configuration 0, Configuration 3, and Configuration 6 of the configuration mode of the frame structure, the period of the channel monitoring sub-frame is M*10 ms, and M is a positive integer; for Configuration 1, Configuration 2, Configuration 4, and Configuration 5 of the configuration mode of the frame structure, the period of the channel monitoring sub-frame is N*5 ms, and N is 1 or a positive even number.

If the period of the channel monitoring sub-frame is 5 ms, two locations in the frame structure will be required to arrange the channel monitoring sub-frame. The two locations can be either the same sub-frame location or different sub-frame locations. For example, for Configuration 5, if the period of the channel monitoring sub-frame is 5 ms, channel monitoring sub-frames can be set at the location of Sub-frame #1 (that is, Sub-frame S) and the location of Sub-frame #6 (that is, Sub-frame D) respectively, in other words, two channel monitoring sub-frames in the same frame structure are in locations of different sub-frame types. As another example, for Configuration 1, if the period of the channel monitoring sub-frame is 5 ms, channel monitoring sub-frames can be set at the location of Sub-frame #1 (that is, Sub-frame S) and the location of Sub-frame #6 (that is, Sub-frame S) respectively, in other words, two channel monitoring sub-frames in the same frame structure are in locations of the same sub-frame type.

Preferably, in or before step 202, the method further comprises: if there are multiple locations available for arranging the channel monitoring sub-frame in the frame structure and the period of the channel monitoring sub-frame is M*10 ms, selecting the first location from the multiple locations to arrange the channel monitoring sub-frame.

Specifically, for Configuration 1, the channel monitoring sub-frame can be arranged at the location of Sub-frame #1 (that is, Sub-frame S) and the location of Sub-frame #6 (that is, Sub-frame S) respectively; if the period of the channel monitoring sub-frame is an integral multiple of 10 ms, the channel monitoring sub-frame can be set at the location of Sub-frame#1 only.

Setting Mode 2

In setting mode 2, during the operation of the LTE system, a load state change rate of the LTE system and a load state change rate of the other systems using the unlicensed frequency band around the LTE system will be detected in real time, and the period of the channel monitoring sub-frame will be set dynamically according to the load state change rate of the LTE system and the load state change rate of the other systems detected in real time.

Preferably, the load state change rate of the LTE system is in inverse proportion to the period of the channel monitoring sub-frame; the load state change rate of the other systems is in inverse proportion to the period of the channel monitoring sub-frame.

In this technical scheme, by setting the period of the channel monitoring sub-frame dynamically according to the load state change rate of the LTE system and/or the load state change rate of the other systems detected in real time, the period of the channel monitoring sub-frame can be more consistent with the working state of the LTE system. Specifically, the greater the load state change rate of the LTE system, the greater the transmission quantity change of the downlink data; the greater the load state change rate of the other systems, the greater the channel state change. Thus, in order to transmit downlink data, the channel state should be detected in short time intervals, that is, the period of the channel monitoring sub-frame should be set to be shorter.

In practice, the period of the channel monitoring sub-frame can be set based on any one or a combination of the setting mode described above.

Preferably, the method further includes: determining whether or not downlink service needs to be processed; if yes, detecting the downlink channel state via the channel monitoring sub-frame in the frame structure.

Specifically, the detection of the downlink channel state via the channel monitoring sub-frame by the base station can be carried out only if it is determined that there is downlink service; or, can be carried out all the way regardless of the existence of the downlink service.

The method can further includes: determining whether the device with base station function and other devices with base station function belong to the same operator; if yes, proceed to step a, that is, setting the location of the channel monitoring sub-frame in the frame structure of the device with base station function and the location of the channel monitoring sub-frame in the frame structure of the other devices with base station function to be the same on the same carrier frequency; otherwise, proceed to step b, that is, setting the location of the channel monitoring sub-frame in the frame structure of the device with base station function and the location of the channel monitoring sub-frame in the frame structure of the other devices with base station function to be different on the same carrier frequency.

In this technical scheme, the purpose of channel detection is to detect whether a base station (or a device with base station function, the following takes the base station as an example for convenience of description, one skilled in the art should be noted that "base station" mentioned in this disclosure includes other devices with base station function) of other operators is using LAA, and whether the channel is occupied by Wi-Fi. Thus, for base stations belonging to the same operator, by configuring locations of channel monitoring sub-frames in the frame structure to be the same on the same carrier frequency, a determination that the channel is busy, which is caused by a mutual detection of signals among base stations belonging to the same operator, can be avoided; for base stations belonging to different operators, locations of channel monitoring sub-frames in the frame structure should be set to be different so as to detect whether the channel is occupied by base stations belonging to different operators.

Preferably, the above-mentioned step b comprises: determining whether the configuration mode of the frame structure of the device with base station function is the same with the configuration mode of the frame structure of the other devices with base station function on the same carrier frequency; and if yes, setting a relative offset between a sub-frame in the frame structure of the device with base station function and a sub-frame of the frame structure of the other devices with base station function.

As described in step b, if frame structures of base stations of different operators have the same configuration, a relative offset between the sub-frames of base stations will be set in order to make sure that the channel monitoring sub-frame can carry out measurement at different times. Of course, if there are multiple locations available for arranging the channel monitoring sub-frame in a frame structure, and if the frame structures of base stations of different operators are the same, the base stations of different operators can arrange the channel monitoring sub-frame at different locations in the frame structure.

Second Implementation

According to the second implementation of the disclosure, it is provided a data transmission system for an LTE system operating in unlicensed frequency band based on Time Division Duplex ("TDD" for short) mode. This system is applicable to a device with base station function.

Figure 3:
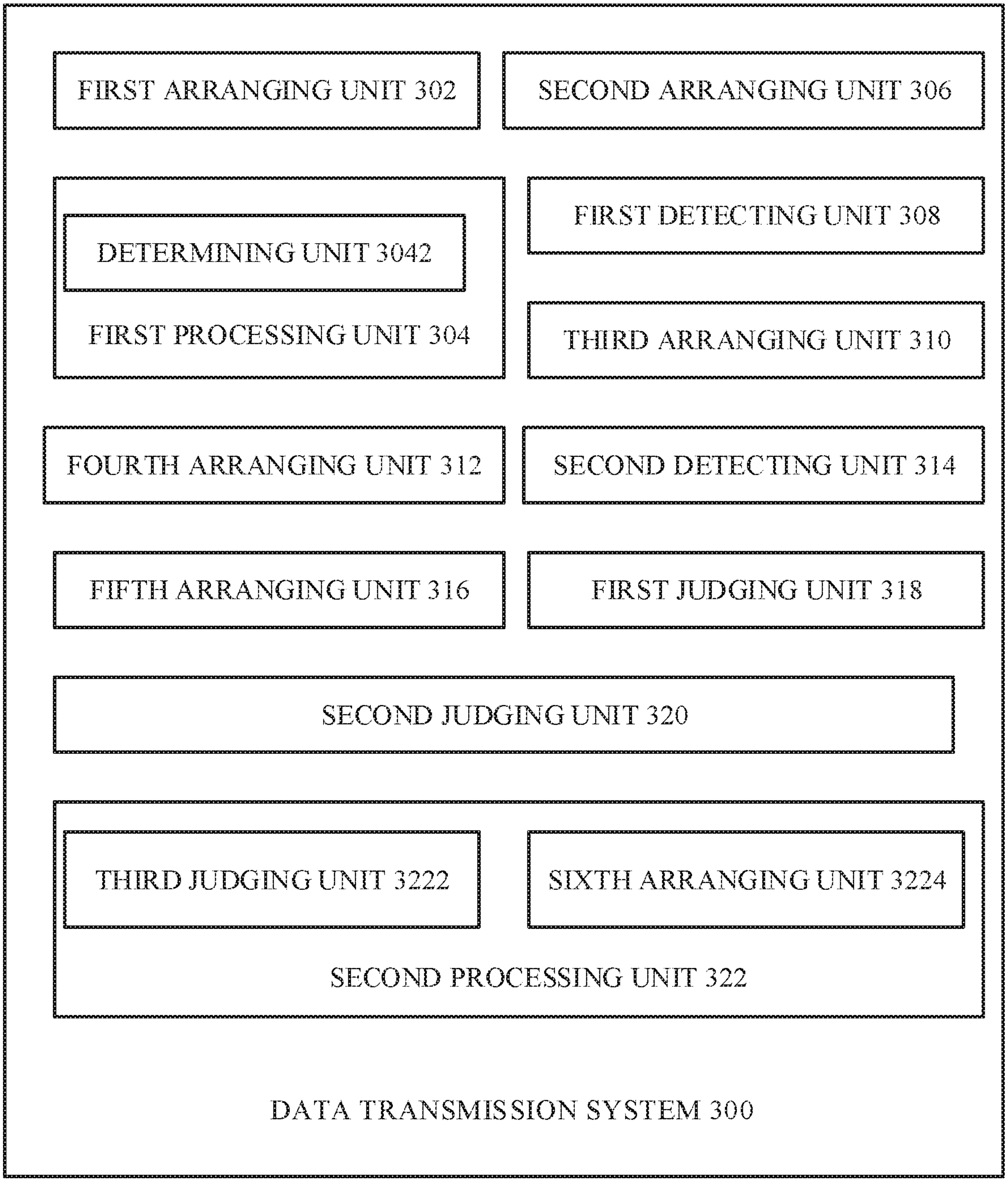
FIG. 3 is a block diagram illustrating a data transmission system for an LTE system operating in unlicensed frequency band based on TDD mode according to an implementation of the disclosure, the system is applicable to a device with base station function.

FIG. 3 is a block diagram illustrating the system according to the second implementation, and as shown in FIG. 3, the system 300 mainly includes a first arranging unit 302 and a first processing unit 304. Specifically, the first arranging unit 302 is configured to arrange a channel monitoring sub-frame used for periodically detecting downlink channel state in a frame structure of TDD mode, and the first processing unit 304 is configured to transmit downlink data via a downlink sub-frame located within any period in the frame structure if the channel monitoring sub-frame detects that a downlink channel is in idle state within the any period, otherwise, not transmit downlink data within the any period.

In the technical scheme described above, by arranging the channel monitoring sub-frame used for detecting the downlink channel state in a frame structure of TDD mode, so as to transmit downlink data via the downlink sub-frame of the above frame structure upon detecting that the downlink channel is in the idle state and not transmit downlink data upon detecting that the downlink channel is in a busy state, whereby a corresponding interference avoidance mechanism can be adopted when the LTE system is operating in the unlicensed frequency band based on TDD mode, and coexistence with other systems such as Wi-Fi system operating in the unlicensed frequency band can be achieved. Normal operation of the LTE system in the unlicensed frequency band can be guaranteed, and larger interference on other systems which have interference avoiding mechanism due to the lack of interference avoiding mechanism of the LTE system can be avoided. The data mentioned includes common interactive data and control signaling; the devices have base station function include base stations and microcells realized by means of communication devices such as smart phones.

Preferably, the first arranging unit 302 is configured to arrange the channel monitoring sub-frame in at least one sub-frame of the frame structure. As a result, there is no need to arrange other additional sub-frames to carry the channel monitoring sub-frame in the frame structure of TDD mode; meanwhile, the channel monitoring sub-frame can be arranged in one or a plurality of sub-frames in the frame structure of TDD mode according to the actual situation of the LTE system. The arrangement location of the channel monitoring sub-frame can be one or more locations in an uplink sub-frame, a downlink sub-frame, or a special sub-frame.

Several preferred setting modes of the channel monitoring sub-frame is exemplified below.

Setting Mode 1

Based on setting mode 1, the first arranging unit 302 is configured to arrange the channel monitoring sub-frame to an uplink sub-frame adjacent to a downlink sub-frame in the frame structure.

By arranging the channel monitoring sub-frame in the uplink sub-frame adjacent to the downlink sub-frame in the frame structure of TDD mode, detection of the downlink channel can be completed before the downlink transmission of the downlink sub-frame is started and after the uplink transmission of the uplink sub-frame is completed, and then it can be determined whether data transmission can be carried out via the downlink sub-frame. Besides, the downlink sub-frame is not occupied by the channel monitoring sub-frame and it can be used for downlink data transmission completely, whereby full use of the downlink sub-frame can be achieved.

Preferably, the first arranging unit 302 is further configured to arrange the channel monitoring sub-frame at the rear end of the uplink sub-frame; the channel monitoring sub-frame occupies a first predetermined number of symbols which is in a range from 1 to 14.

By arranging the channel monitoring sub-frame at the rear end of the uplink sub-frame, timeliness of channel detection can be guaranteed. Thus, the channel state detected prior to downlink data transmission is the latest status, whereby effects on the downlink data transmission due to channel state change that occurs when the downlink data is to be transmitted can be avoided, wherein the channel state change occurs because the channel detection is earlier and the downlink data transmission is late.

Specially, suppose the channel detection is earlier and it is detected that the channel is busy; since the downlink data transmission is relatively late, that is to say, the channel monitoring sub-frame is far away from the downlink sub-frame, the channel may be in the idle state when the downlink data is to be transmitted. The LTE system will not carry out downlink data transmission but wait for the next channel detection because the detecting result is that the channel is busy, as a result, the downlink data cannot be transmitted. Similarly, suppose the channel detection is earlier and it is detected that the channel is in the idle state; since the downlink data transmission is relatively late, the channel may become busy when the downlink data is to be transmitted even though the detecting result is that the channel is idle, at this time, the LTE system will transmit downlink data without waiting for the next channel detection, and this will cause interference on other systems.

Setting Mode 2

Based on setting mode 2, the first arranging unit 302 is configured to arrange the channel monitoring sub-frame to a downlink sub-frame adjacent to an uplink sub-frame in the frame structure.

By arranging the channel monitoring sub-frame in the downlink sub-frame adjacent to the uplink sub-frame in the frame structure of TDD mode, measurements of the downlink channel can be carried out in time if downlink transmission is required. Meanwhile, the uplink sub-frame is not occupied by the channel monitoring sub-frame and it can be used for uplink data transmission completely, whereby full use of the uplink sub-frame can be achieved.

Preferably, the first arranging unit 302 is further configured to arrange the channel monitoring sub-frame at the front end of the downlink sub-frame; the channel monitoring sub-frame occupies a second predetermined number of symbols which is in a range from 1 to 14.

By arranging the channel monitoring sub-frame at the front end of the downlink sub-frame, the rest of the downlink sub-frame will continue to be utilized for the downlink data transmission, which ensures full utilization of the downlink sub-frame.

Setting Mode 3

Based on setting mode 3, the first arranging unit 302 is configured to arrange the channel monitoring sub-frame to a special sub-frame in the frame structure.

By arranging the channel monitoring sub-frame in the special sub-frame, there is no need to occupy the downlink sub-frame and the uplink sub-frame, therefore the uplink transmission and the downlink transmission of the system will not be affected. On the same carrier frequency, for different base stations of the same operator, if the channel monitoring sub-frame is arranged in the special sub-frame and at the same location of the frame structure, a base station of another operator will be taken as a reference when the different base stations detecting channel state, and the channel will not be deemed as busy even though a base station signal of the same operator is detected.

Preferably, the first arranging unit 302 is configured to arrange the channel monitoring sub-frame to a location adjacent to UpPTS in the special sub-frame; the channel monitoring sub-frame occupies a third predetermined number of symbols which is in a range from 1 to 9.

In the frame structure of TDD mode, it is required to set GP when the downlink sub-frame switching to the uplink sub-frame. The channel monitoring sub-frame needs to monitor an uplink signal to detect the channel state. By arranging the channel monitoring sub-frame to the location adjacent to UpPTS, that is, between UpPTS and GP or after UpPTS, compared with the situation where the channel monitoring sub-frame is arranged before UpPTS or between DwPTS and GP, there is no need to set an additional GP.

The minimum number of symbols occupied by UpPTS or GP is 1 symbol, and the minimum number of symbols occupied by DwPTS is 3 symbols; since 14 symbols are included in one sub-frame, the maximum number of symbols occupied by the channel monitoring sub-frame arranged in the special sub-frame is 9 symbols, and the minimum number thereof is 1 symbol.

The channel monitoring sub-frame can detect the downlink channel state via the following configuration. The first arranging unit 304 includes a determining unit 3042, which is configured to determine that the downlink channel is in the idle state if it is detected in each symbol occupied by the channel monitoring sub-frame that the downlink channel is in the idle state, otherwise, determine that the downlink channel is in non-idle state.

In this technical scheme, the detection is performed once every symbol by the channel monitoring sub-frame, thus, the downlink channel can be determined to be in the idle state if it is detected in each symbol occupied by the channel monitoring sub-frame that the downlink channel is in the idle state.

The number of the symbols occupied by the channel monitoring sub-frame can be set via the following configuration. The system 300 further includes a second arranging unit 306, which is configured to arrange the number of the symbols occupied by the channel monitoring sub-frame to be fixed during the operation of the LTE system. Alternatively, the system can further include: a first detecting unit 308, configured to detect a channel condition change rate of other systems using the unlicensed frequency band around the LTE system in real time during the operation of the LTE system, and a third arranging unit 310, configured to arrange the number of symbols occupied by the channel monitoring sub-frame dynamically according to the channel condition change rate detected in-real time by the first detecting unit 308 and/or the channel detecting ability of the device with base station function.

Specifically, the channel condition change rate of the other systems is in direct proportion to the number of symbols occupied by the channel monitoring sub-frame; the channel detecting ability of the device with base station function is in inverse proportion to the number of symbols occupied by the channel monitoring sub-frame.

As can be seen, in the technical scheme described above, the number of symbols occupied by the channel monitoring sub-frame can be fixed, or can be adjusted according to the actual situation during the operation of the LET system. In the latter case, in order to measure the downlink channel state precisely, if the channel condition change rate of the other systems using the unlicensed frequency band around the LTE system is relatively fast, multiple measurement of the downlink channel state will be needed, that is, the number of symbols occupied by the channel monitoring sub-frame is set to be larger. Similarly, if the LTE system has poor channel detecting ability, multiple measurement of the downlink channel state will be needed either, that is, the number of symbols occupied by the channel monitoring sub-frame is set to be larger. Thus, the channel condition change rate of the other systems is in direct proportion to the number of symbols occupied by the channel monitoring sub-frame; the channel detecting ability of the device with base station function is in inverse proportion to the number of symbols occupied by the channel monitoring sub-frame.

Period of the channel monitoring sub-frame can be set in one of the following mode.

Setting Mode 1

In setting mode 1, the system 300 further includes a fourth arranging unit 312, which is configured to set the period of the channel monitoring sub-frame according to the number of downlink sub-frames included in each switch point period in the frame structure.

Specifically, if there are fewer downlink sub-frames included in each switch point period of the frame structure, such as for Configuration 0, Configuration 3, and Configuration 6, the period of the channel monitoring sub-frame can be set to be longer; in contradistinction, if there are relatively more sub-frames included in each switch point, the period of the channel monitoring sub-frame can be set to be shorter in order to determine whether to transmit downlink data according to the real-time state of the downlink channel.

As one example, the fourth arranging unit 312 is specifically configured to set the period of the channel monitoring sub-frame to be M*10 ms for Configuration 0, Configuration 3, and Configuration 6 of the configuration mode of the frame structure, M is a positive integer; and set the period of the channel monitoring sub-frame to be N*5 ms for Configuration 1, Configuration 2, Configuration 4, and Configuration 5 of the configuration mode of the frame structure, N is 1 or a positive even number.

If the period of the channel monitoring sub-frame is 5 ms, two locations in the frame structure will be required to arrange the channel monitoring sub-frame. The two locations can be either the same sub-frame location or different sub-frame locations. For example, for Configuration 5, if the period of the channel monitoring sub-frame is 5 ms, channel monitoring sub-frames can be set at the location of Sub-frame #1 (that is, Sub-frame S) and the location of Sub-frame #6 (that is, Sub-frame D) respectively, in other words, two channel monitoring sub-frames in the same frame structure are in locations of different sub-frame types. As another example, for Configuration 1, if the period of the channel monitoring sub-frame is 5 ms, channel monitoring sub-frames can be set at the location of Sub-frame #1 (that is, Sub-frame S) and the location of Sub-frame #6 (that is, Sub-frame S) respectively, in other words, two channel monitoring sub-frames in the same frame structure are in locations of the same sub-frame type.

Preferably, the first arranging unit 302 is further configured to select a first location from multiple locations available for arranging the channel monitoring sub-frame to arrange the channel monitoring sub-frame if the multiple locations are included in the frame structure and the period of the channel monitoring sub-frame is M*10 ms.

Specifically, for Configuration 1, the channel monitoring sub-frame can be arranged at the location of Sub-frame #1 (that is, Sub-frame S) and the location of Sub-frame #6 (that is, Sub-frame S) respectively; if the period of the channel monitoring sub-frame is an integral multiple of 10 ms, the channel monitoring sub-frame can be set at the location of Sub-frame#1 only.

Setting Mode 2

In setting mode 2, the system 300 can further include: a second detecting unit 314, configured to detect the load state change rate of the LTE system and the load state change rate of the other systems using the unlicensed frequency band around the LTE system in real time during the operation of the LTE system; and a fifth arranging unit 316, configured to set the period of the channel monitoring sub-frame dynamically according to the load state change rate of the LTE system and the load state change rate of the other systems detected in real time by the second detecting unit 314.

Preferably, the load state change rate of the LTE system is in inverse proportion to the period of the channel monitoring sub-frame; the load state change rate of the other systems is in inverse proportion to the period of the channel monitoring sub-frame.

In this technical scheme, by setting the period of the channel monitoring sub-frame dynamically according to the load state change rate of the LTE system and/or the load state change rate of the other systems detected in real time, the period of the channel monitoring sub-frame can be more consistent with the working state of the LTE system. Specifically, the greater the load state change rate of the LTE system, the greater the transmission quantity change of the downlink data; the greater the load state change rate of the other systems, the greater the channel state change. Thus, in order to transmit downlink data, the channel state should be detected in short time intervals, that is, the period of the channel monitoring sub-frame should be set to be shorter.

In practice, the period of the channel monitoring sub-frame can be set based on any one or a combination of the setting mode described above.

Preferably, the system 300 further includes a first judging unit 318, which is configured to judge whether or not downlink service needs to be processed; and the first processing unit 304 is configured to detect the downlink channel state via the channel monitoring sub-frame in the frame structure if the result of the first judging unit is yes.

Specifically, the detection of the downlink channel state via the channel monitoring sub-frame by the base station can be carried out only if it is determined that there is downlink service; or, can be carried out all the way regardless of the existence of the downlink service.

The system can still include: a second judging unit 320, configured to judge whether the device with base station function and other devices with base station function belong to the same operator; a second processing unit 322, configured to set the location of the channel monitoring sub-frame in the frame structure of the device with base station function and the location of the channel monitoring sub-frame in the frame structure of the other devices with base station function to be the same on the same carrier frequency if the result of the second judging unit 320 is yes, otherwise, set the location of the channel monitoring sub-frame in the frame structure of the device with base station function and the location of the channel monitoring sub-frame in the frame structure of the other devices with base station function to be different on the same carrier frequency.

In this technical scheme, the purpose of channel detection is to detect whether a base station (or a device with base station function, the following takes "base station" as an example for convenience of description, one skilled in the art should be noted that "base station" mentioned in this disclosure includes other devices with base station function) of other operators is using LAA, and whether the channel is occupied by Wi-Fi. Thus, for base stations belonging to the same operator, by configuring locations of channel monitoring sub-frames in the frame structure to be the same on the same carrier frequency, a determination that the channel is busy, which is caused by a mutual detection of signals among base stations belonging to the same operator, can be avoided; for base stations belonging to different operators, locations of channel monitoring sub-frames in the frame structure should be set to be different so as to detect whether the channel is occupied by base stations belonging to different operators.

Preferably, the second processing unit 322 includes: a third judging unit 3222, configured to judge whether the configuration mode of the frame structure of the device with base station function is the same with the configuration mode of the frame structure of the other devices with base station function on the same carrier frequency if the result of the second judging unit 320 is no; and a sixth arranging unit 3224, configured to set a relative offset between a sub-frame in the frame structure of the device with base station function and a sub-frame of the frame structure of the other devices with base station function if the result of the third judging unit 3222 is yes.

In the technical scheme, if frame structures of base stations of different operators have the same configuration, a relative offset between the sub-frames of base stations will be set in order to make sure that the channel monitoring sub-frame can carry out measurement at different times. Of course, if there are multiple locations available for arranging the channel monitoring sub-frame in a frame structure, and if the frame structures of base stations of different operators are the same, the base stations of different operators can arrange the channel monitoring sub-frame at different locations in the frame structure.

According to another implementation of the present disclosure, it is provided a device with base station function. This device includes the data transmission system 300 for an LTE system operating in unlicensed frequency band based on TDD mode according to the second implementation as illustrated in FIG. 3, for details, please refer to the technical schemes described in the first and second implementations.

As one implementation, the hardware architecture which can be adopted to achieve the device with base station function described above or other technical schemes of the disclosure can be a data processing system or other apparatus which may includes a memory and at least one processor. One or more programs is stored in the memory, when executed by the one or more processors, adapted to perform the quick transmission handover scheme of any of the implementations of the disclosure.

Figure 8:
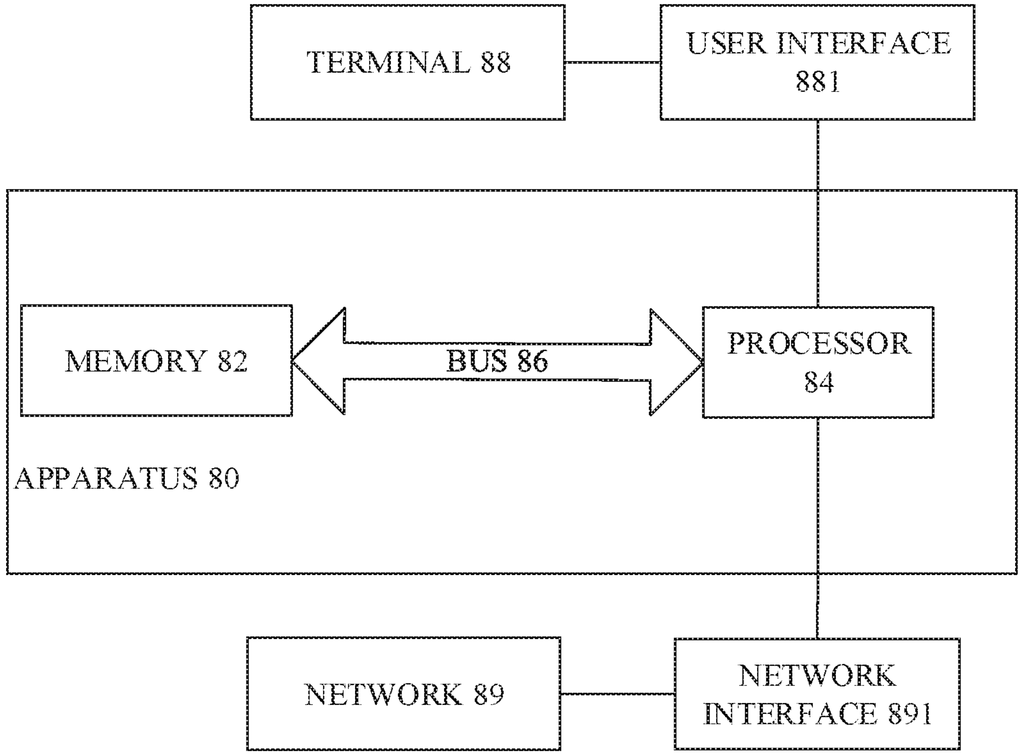
FIG. 8 is a block diagram illustrating an apparatus of an implementation of the disclosure.

Based on this, specifically, according to the implementation of the present disclosure, it is provided an apparatus. FIG. 8 is a block diagram illustrating the apparatus. As shown in FIG. 8, the apparatus 80 includes a memory 82 and at least one processor 84 (for clarity, only one is illustrated in the figure). Wherein the memory 82 and the processor 84 can be connected in a wired or wireless manner, for example, through a bus 86. For example, the apparatus 80 of the implementation can be a server in communicate with a wireless music system, or, can be a computing device built in the wireless music system.

To be specific, the memory 82 is configured to store computer-readable program code, and can be ROM, RAM, CD-RAM, or any other removable storage medium; the processor 84 is configured to invoke the computer-readable program code stored in the memory 82 to execute predetermined process such as the methods according to the implementations of the present disclosure described above, to avoid unnecessarily obscuring the present disclosure, the details of the methods or process is not provided here. In addition, as shown in FIG. 8, the processor 84 can but not necessarily connect to a terminal 88 through a user interface 881 or to a network 89 through a network interface 891. Alternatively, the processor can also connect to the outside terminal or network in a wireless manner.

Hereinafter, the technical scheme of the disclosure will be described in detail with refer to FIG. 4-FIG. 7B.

The technical scheme of the disclosure mainly relates to a interference avoidance mechanism which is involved when the LTE system is using the unlicensed frequency band based on TDD mode, and aims to provide a Listen Before Talk ("LBT" for short) mechanism and a frame structure which can be used for downlink channel measurement. In the following, LBT subject, LBT time, LBT period, and maximum time length or data package size that can be transmitted when the channel is in idle state will be explained.

At the beginning, the frame structure of TDD will be introduced.

Figure 4:
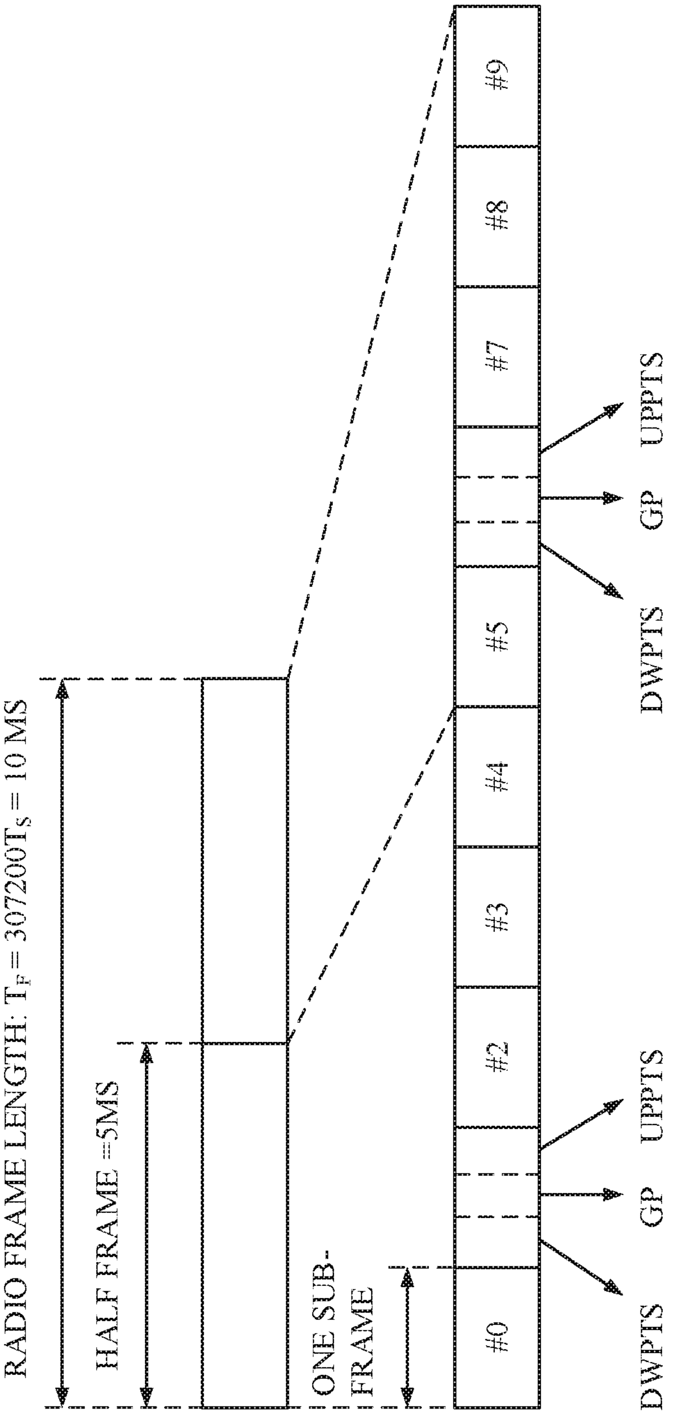
FIG. 4 is a schematic diagram illustrating a TDD frame structure in which the downlink to uplink switch period is 5 ms.

FIG. 4 is a schematic diagram illustrating the TDD frame structure in which the downlink-uplink switch period is 5 ms. For this TDD frame structure, eight normal sub-frames and two special sub-frames are included in one frame. Configurations (that is, for downlink transmission or uplink transmission) of the eight normal sub-frames can refer to Table 1. For the TDD frame structure in which the downlink-uplink switch period is 10 ms, nine normal sub-frames and one special sub-frame are included in one frame, configurations (that is, for downlink transmission or uplink transmission) of the nine normal sub-frames can refer to Table 1 either. Besides, fourteen symbols are included in one normal sub-frame.

TABLE 1

| Uplink-downlink configuration | Downlink-to-Uplink Switch-point | Subframe number 0 | 1 | 2 | 3 | 4 | 5 | 6 | 7 | 8 | 9 |
|---|---|---|---|---|---|---|---|---|---|---|---|
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

When the unlicensed frequency band is utilized by the LTE system based on TDD mode, the base station (or a device with base station function, the following takes "base station" as an example for convenience of description, one skilled in the art should be noted that "base station" mentioned in this disclosure includes other devices with base station function) is responsible for detecting whether the downlink channel is occupied.

The location of the LBT sub-frame (that is, the channel monitoring sub-frame) can be varied. Three exemplary setting modes are illustrated blow. In the following, the uplink sub-frame ("U sub-frame" for short) is expressed in "U" in Tables, the downlink sub-frame ("D sub-frame" for short) is expressed in "D" in Tables, and the special sub-frame ("S sub-frame" for short) is expressed in "S" in Tables.

Exemplary Setting Mode 1

The LBT sub-frame is arranged in a U sub-frame which is immediately followed by a D sub-frame. Specifically, the LBT sub-frame is arranged at locations indicated by asterisks in Table 2.

TABLE 2

| Uplink-downlink configuration | Downlink-to-Uplink Switch-point | Subframe number 0 | 1 | 2 | 3 | 4 | 5 | 6 | 7 | 8 | 9 |
|---|---|---|---|---|---|---|---|---|---|---|---|
| 0 | 5 ms | D | S | U | U | U* | D | S | U | U | U |
| 1 | 5 ms | D | S | U | U* | D | D | S | U | U* | D |
| 2 | 5 ms | D | S | U* | D | D | D | S | U* | D | D |
| 3 | 10 ms | D | S | U | U | U* | D | D | D | D | D |
| 4 | 10 ms | D | S | U | U* | D | D | D | D | D | D |
| 5 | 10 ms | D | S | U* | D | D | D | D | D | D | D |
| 6 | 5 ms | D | S | U | U | U* | D | S | U | U* | D |

If there are two locations available for arranging the LBT detecting sub-frame in one frame structure, that is the case in which the LBT repetition period is 5 ms. If the LBT repetition period is 10 ms or above, the LBT detecting sub-frame can be arranged at a location which is in the lead of the frame structure only.

Figure 5:
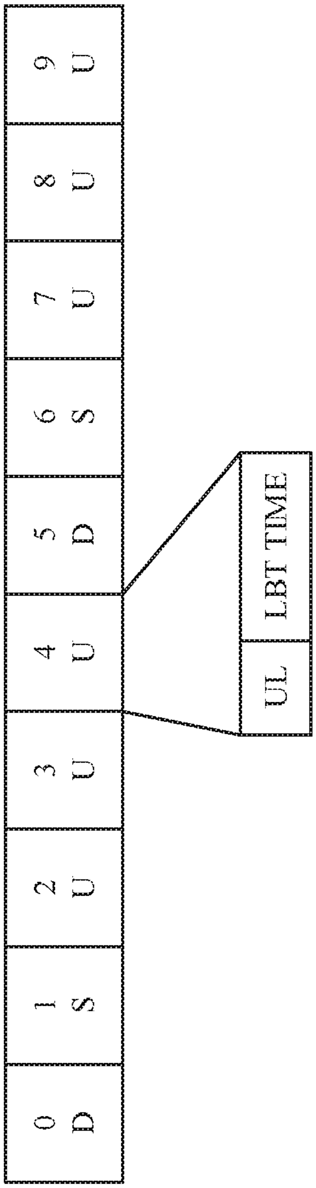
FIG. 5 is a structure diagram illustrating a channel monitoring sub-frame which is arranged in an uplink sub-frame according to an implementation of the disclosure.

Alternatively, the LBT sub-frame can be arranged in last few symbols of the U sub-frame, and the detection time length of the LBT sub-frame can be N1 symbols, wherein N1=1, 2, 3, 14. The value of N1 can be set statically or semi statically according to the actual situation. In addition, other symbols in the U sub-frame can continue to be utilized for uplink transmission. Specifically, FIG. 5 illustrates the structure of a U sub-frame used for LBT detection while taking TDD Configuration 0 as an example. As shown in FIG. 5, the LBT sub-frame is arranged in Sub-frame #4 (that is, U sub-frame) and at the back end thereof.

Exemplary Setting Mode 2

As indicated by asterisks in Table 3, the LBT sub-frame is arranged in the first D sub-frame after the U sub-frame.

TABLE 3

| Uplink-downlink configuration | Downlink-to-Uplink Switch-point | Subframe number 0 | 1 | 2 | 3 | 4 | 5 | 6 | 7 | 8 | 9 |
|---|---|---|---|---|---|---|---|---|---|---|---|
| 0 | 5 ms | D* | S | U | U | U | D | S | U | U | U |
| 1 | 5 ms | D | S | U | U | D* | D | S | U | U | D* |
| 2 | 5 ms | D | S | U | D* | D | D | S | U | D* | D |
| 3 | 10 ms | D | S | U | U | U | D* | D | D | D | D |
| 4 | 10 ms | D | S | U | U | D* | D | D | D | D | D |
| 5 | 10 ms | D | S | U | D* | D | D | D | D | D | D |
| 6 | 5 ms | D | S | U | U | U | D* | S | U | U | D* |

If there are two locations available for arranging the LBT detecting sub-frame in one frame structure, that is the case in which the LBT repetition period is 5 ms. If the LBT repetition period is 10 ms or above, the LBT detecting sub-frame can be arranged at a location which is in the lead of the frame structure only.

Figure 6:
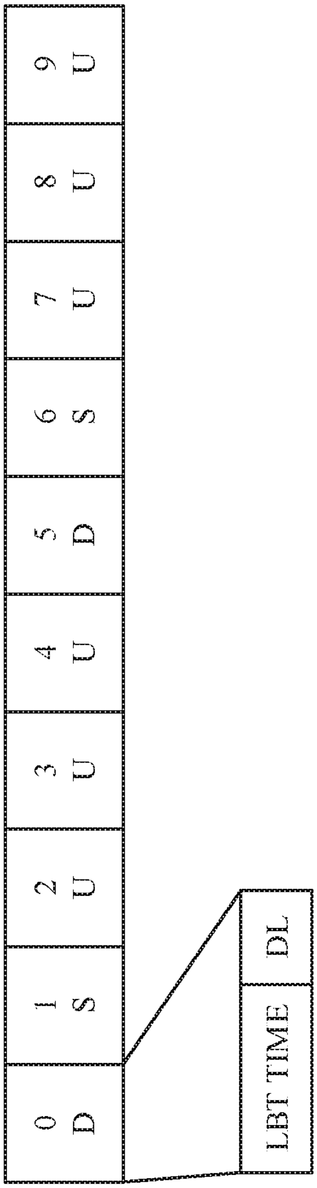
FIG. 6 is a structure diagram illustrating a channel monitoring sub-frame which is arranged in a downlink sub-frame according to an implementation of the disclosure.

Furthermore, the LBT sub-frame is arranged in the first few symbols of the D sub-frame, and the detection time length of the LBT sub-frame can be N2 symbols, wherein N2=1, 2, 3, 14. The value of N2 can be set statically or semi statically according to the actual situation. Other symbols in the D sub-frame can continue to be utilized for downlink transmission, such as Primary Synchronization Signal/Secondary Synchronization Signal ("PSS/SSS" for short) transmission, Cell-specific Reference Signal ("CRS" for short) transmission, Channel State Information-Reference Signal ("CSI-RS" for short) transmission, Discovery Signal ("DS" for short) transmission, Physical Downlink Control Channel ("PDCCH" for short) transmission, enhanced Physical Downlink Control Channel ("ePDCCH" for short) transmission, Physical Downlink Shared Channel ("PDSCH" for short) transmission, beacon signal like WiFi transmission, Uplink grant transmission, and Hybrid Automatic Repeat request ("HARQ" for short) feedback, etc. Specifically, FIG. 6 illustrates the structure of a D sub-frame for LBT detection while taking TDD Configuration 0 as an example; as shown in FIG. 6, the LBT sub-frame is arranged in Sub-frame #0 (that is, D sub-frame) and at the front end thereof.

Exemplary Setting Mode 3

The LBT sub-frame is arranged in a S sub-frame and at locations indicated by asterisks as illustrated in Table 4.

TABLE 4

| Uplink-downlink configuration | Downlink-to-Uplink Switch-point | Subframe number 0 | 1 | 2 | 3 | 4 | 5 | 6 | 7 | 8 | 9 |
|---|---|---|---|---|---|---|---|---|---|---|---|
| 0 | 5 ms | D | S* | U | U | U | D | S* | U | U | U |
| 1 | 5 ms | D | S* | U | U | D | D | S* | U | U | D |
| 2 | 5 ms | D | S* | U | D | D | D | S* | U | D | D |
| 3 | 10 ms | D | S* | U | U | U | D | D | D | D | D |
| 4 | 10 ms | D | S* | U | U | D | D | D | D | D | D |
| 5 | 10 ms | D | S* | U | D | D | D | D | D | D | D |
| 6 | 5 ms | D | S* | U | U | U | D | S* | U | U | D |

If there are two locations available for arranging the LBT detecting sub-frame in one frame structure, that is the case in which the LBT repetition period is 5 ms. If the LBT repetition period is 10 ms or above, the LBT detecting sub-frame can be arranged at a location which is in the lead of the frame structure only.

Figure 7A:
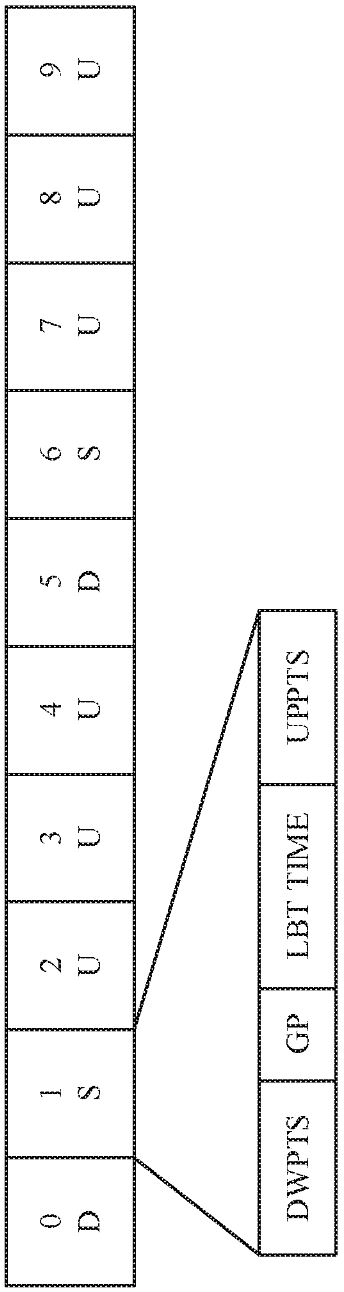
FIG. 7A is a structure diagram illustrating a channel monitoring sub-frame which is arranged in a special sub-frame according to an implementation of the disclosure.
Figure 7B:
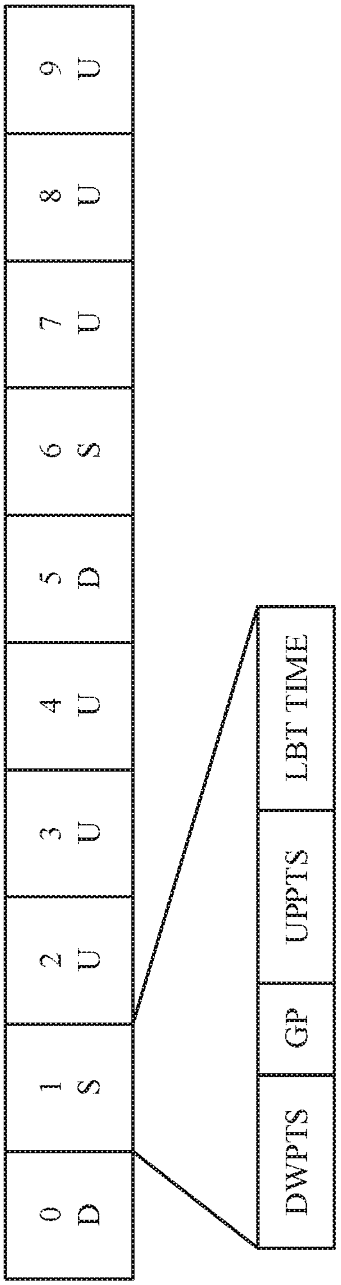
FIG. 7B is a structure diagram illustrating a channel monitoring sub-frame which is arranged in a special sub-frame according to another implementation of the disclosure.

As described above, the S sub-fame includes Downlink Pilot Time Slot ("DwPTS" for short), Uplink Pilot Time Slot ("UpPTS" for short), and Guard Period ("GP" for short). As shown in FIG. 7A, a LBT time can be inserted between GP and UpPTS; or, can be arranged in last few symbols of the S sub-frame. As shown in FIG. 7B, LBT time is arranged after UpPTS.

The time occupied by LBT time in the S sub-frame will now be explained.

In Table 5, time length configuration of DwPTS and UpPTS in accordance with 36.311 standard is shown. Excluding the time occupied by DwPTS and UpPTS, the remaining time of 1 ms is the time length of GP. In order to insert LBT time within 1 ms, it is necessary to reduce the sum of the time length of DwPTS, UpPTS, and GP to less than 1 ms, and the rest of 1 ms will be utilized for LBT time.

TABLE 5

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · Ts | 2192 · Ts | 2560 · Ts | 7680 · Ts | 2192 · Ts | 2560 · Ts |
| 1 | 19760 · Ts | | | 20480 · Ts | | |
| 2 | 21952 · Ts | | | 23040 · Ts | | |
| 3 | 24144 · Ts | | | 25600 · Ts | | |
| 4 | 26336 · Ts | | | 7680 · Ts | | |
| 5 | 6592 · Ts | 4384 · Ts | 5120 · Ts | 20480 · Ts | 4384 · Ts | 5120 · Ts |
| 6 | 19760 · Ts | | | 23040 · Ts | | |
| 7 | 21952 · Ts | | | 12800 · Ts | | |
| 8 | 24144 · Ts | | | — | — | — |
| 9 | 13168 · Ts | | | — | — | — |

Basically, the length of UpPTS is relatively fixed, normally one or two symbols; in contrast, for DwPTS and GP, there can be variety of length configuring modes according to different cell radius. In order to guarantee LBT time, the length of DwPTS or GP needs to be configured to be shorter. As a result, for configurations of DwPTS or UpPTS illustrated in Table 5, the configuration in which the sum of length of DwPTS and UpPTS exceeding 13 symbols will not be selected. The reason is, the minimum number of symbols occupied by GP or UpPTS is one symbol respectively, and the minimum number of symbols occupied by DwPTS is three symbols; thus, the maximum detecting time length of the LBT sub-frame is nine symbols, and at least one symbol should be guaranteed. In other words, the LBT detecting time can be N3 symbols, N3=1, 2, 3, 9 The value of N3 can be set statically or semi statically according to the actual situation.

In any of the above-described setting mode, there is no need to set an additional GP between the D sub-frame and the U sub-frame.

1) For exemplary setting mode 1, the LBT sub-frame is arranged in the U sub-frame, and the uplink characteristic of the U sub-frame is not changed. The D sub-frame can be fully used because it is not occupied by the LBT sub-frame. Furthermore, because the LBT sub-frame is arranged in the U sub-frame which is immediately followed by the D sub-frame, the timeliness of channel detection can be guaranteed.

2) For exemplary setting mode 2, the LBT sub-frame is arranged in the D sub-frame, and the downlink characteristic of the D sub-frame is changed, but no additional U sub-frame is occupied for downlink LBT channel detection.

3) For exemplary setting mode 3, the LBT sub-frame is arranged in the S sub-frame and the normal U sub-frame and D sub-frame is not occupied; however, the length of DwPTS and GP is restricted. The advantage of exemplary setting mode 3 is that various TDD downlink/uplink configurations can use the S sub-frame of Sub-frame #1 for LBT detection. As a result, even if an adjacent cell use a different TDD configuration, external signal strength will be detected because of the same LBT time, and the channel will not be deemed to be busy just because the signal strength of the adjacent cell is detected.

Furthermore, for exemplary setting modes 1 and 2, LBT sub-frames being utilized for the TDD uplink/downlink configuration did not synchronize with each other. If the adjacent cell uses a different TDD configuration, Cell #2 may perform uplink or downlink transmission while Cell #1 performing LBT detection, and Cell #1 may detect that the channel is busy; however, in fact, the channel can be occupied by Cell #1, hence there may be errors. In comparison, exemplary setting mode 3 is more suitable for the scenario that different TDD uplink/downlink configurations are adopted by the same operator in the same frequency band. Exemplary setting modes 1 and 2 can be applicable to the above-mentioned scenario if the base station can distinguish between different operators or WiFi signals.

In addition, LBT detection will be performed every single symbol to determine whether the channel is busy or not. The channel will be determined to be busy after the end of LBT detection only if the channel is detected to be busy for each symbol. In order to facilitate understanding, the LBT detection can be taken as multiple steps, one step corresponds to one symbol respectively.

Hereinafter, the LBT repetition period will be explained.

Specifically, for different uplink/downlink configurations, the LBT repetition period can be the same or different, and will be described separately.

1) The LBT repetition period is the same. The maximum uplink/downlink switch period is 10 ms, and from the above analysis of sub-frames for arranging the LBT time, one can learn that for some uplink/downlink configurations, the minimum period is 10 ms. Thus, the LBT repetition period is N4×10 ms, and N4 is a positive integer.

2) The LBT repetition period is different. For example, for TDD Configuration 2, the repetition period is N5×5 ms, N5=1, 2, 4, 6, 8, there are three D sub-frames in each 5 ms, and it is worth spending the time for one LBT detection every 5 ms. For TDD Configuration 3, the repetition period is N6×10 ms, N6=1, 2, 3, 4, there is only one D sub-frame in the first 5 ms, and therefore, it is not worth spending the time for one LBT detection. Table 6 illustrates the possible LBT repetition period for each configuration.

TABLE 6

| Uplink/Downlink Configuration | LBT repetition period |
|---|---|
| 0 | 10 ms, 20 ms, 30 ms, . . . |
| 1 | 5 ms, 10 ms, 20 ms, 30 ms, . . . |
| 2 | 5 ms, 10 ms, 20 ms, 30 ms, . . . |
| 3 | 10 ms, 20 ms, 30 ms, . . . |
| 4 | 5 ms, 10 ms, 20 ms, 30 ms, . . . |
| 5 | 5 ms, 10 ms, 20 ms, 30 ms, . . . |
| 6 | 10 ms, 20 ms, 30 ms, . . . |

The position of the sub-frame in which the LBT sub-frame is located, the number of symbols occupied by the LBT sub-frame, and the LBT repetition period can be combined arbitrarily. For TDD uplink/downlink Configuration 2, the LBT sub-frame can be arranged in the U sub-frame, the D sub-frame, or the S sub-frame; the minimum repetition period can be 5 ms or 10 ms, and the number of symbols occupied by the LBT sub-frame can have different optional values.

As described above, the LBT repetition period is composed of the LBT detecting sub-frame and other sub-frames, and the number of D sub-frames among the other sub-frames is the maximum channel transmission time that can be occupied after it is LBT-detected that the channel is idle. If it is determined that the channel is idle by the LBT detecting sub-frame, then the other D sub-frames can be utilized for downlink transmission; otherwise, the other D sub-frames cannot be utilized for downlink transmission. That is to say, the maximum time for downlink transmission upon detecting that the channel is idle is restricted by the LBT repetition time. For example, for TDD downlink/uplink Configuration 2, if LBT detection is conducted at S sub-frame #1 and the LBT repetition period is 5 ms, the maximum downlink sub-frame is D sub-frame #3, #4, and #5; after D sub-frame #5, LBT detection can be conducted at S sub-frame #6 again.

Hereinafter, LBT configurations for base stations of the same or different operator will be illustrated.

1) All the base stations belong to the same operator. When using the unlicensed frequency band, LBT detection time is the same on the same carrier frequency. The main purpose of LBT detection is to detect whether LAA is utilized by other operators in this carrier frequency or by any WiFi system. Since the unlicensed frequency band can be unitized by base stations of the same operator simultaneously, for the base stations of the same operator, conducting LBT detection at the same time would be equivalent to not transmitting signal but monitoring external signal strength only.

Specifically, if the TDD uplink/downlink configurations on the same carrier frequency is the same, all of the base stations can conduct LBT detection at the same time regardless of the sub-frame (that is, U sub-frame, S sub-frame, or S sub-frame) being utilized for LBT detection. On the other hand, if the TDD uplink/downlink configuration on the same carrier frequency is different, LBT detection can only be conducted at the S sub-frame so as to guarantee that all of the base stations can conduct LBT detection at the same time.

2) The base stations belong to different operators. When using the unlicensed frequency band, the LBT detection time is different on the same carrier frequency. For example, when Operator A is conducting LBT detection and not transmitting signal, Operator B may be in signal transmission of but not in LBT detection, thus, whether the channel is occupied by Operator B can be detected.

Specifically, for base stations belong to different operators, if the TDD uplink/downlink configuration on the same carrier frequency is different, the LBT detection time can be different only if LBT detection is conducted in the U sub-frame or the D sub-frame and the location of LBT in the U sub-frame or the D sub-frame is different. On the other hand, if the TDD uplink/downlink configuration on the same carrier frequency is the same, in order to make sure that LBT detection is conducted at different times, a sub-frame offset need to take different values for different operators, that is to say, in the frame structure of different operators, a relative offset will need to be set in sub-frames.

Furthermore, LBT detection of the base station can be conducted periodically regardless of the existence of downlink service; or, can be conducted periodically only if there is downlink service.

With the aid of the LBT detection scheme, when the unlicensed frequency band is utilized by the LTE system, it can be monitored in advance whether the channel is utilized by any WiFi device or other systems; if yes, the channel will not be occupied by the LTE system, and the LTE system can coexistence with the existing access technology such as Wi-Fi in the unlicensed frequency band.

The novel data transmission method and system for an LTE system operating in the unlicensed frequency band based on TDD mode have been described with refer to the accompanying drawings. With the aid of the technical schemes of this disclosure, normal operation of the LTE system in the unlicensed frequency band can be ensured, furthermore, significant interference with regard to other systems generated by the LTE system when operating in the unlicensed frequency band can be prevented, and therefore coexistence of the LTE system and the other systems in the unlicensed frequency band can be achieved.

The foregoing descriptions are merely preferred implementations of the present disclosure, rather than limiting the present disclosure. Various modifications and alterations may be made to the present disclosure for those skilled in the art. Any modification, equivalent substitution, improvement or the like made within the spirit and principle of the present disclosure shall fall into the protection scope of the present disclosure.

What is claimed is:

1. A method for operating a Long Term Evolution (LTE) system in an unlicensed frequency band based on a Time Division Duplex (TDD) mode for a device configurable as a base station, comprising:

arranging, by a first device, a channel monitoring sub-frame for periodically detecting a downlink channel state in a frame structure of the TDD mode, wherein the first device is configurable as a first base station;

within a period, during the channel monitoring sub-frame, determining whether a downlink channel is in an idle state;

based on a determination that the downlink channel is in the idle state, transmitting downlink data via a downlink sub-frame within the period, wherein the downlink sub-frame is located in the frame structure of the TDD mode;

based on a determination that the downlink channel is not in the idle state, not transmitting downlink data within the period; and setting the period of the channel monitoring sub-frame according to a number of downlink sub-frames included in each switch point period in the frame structure, wherein arranging the channel monitoring sub-frame comprises:

when the period of the channel monitoring sub-frame is M*10 ms, M being a positive integer:

arranging the channel monitoring sub-frame in at least one subframe of the frame structure of the TDD mode; and when the period of the channel monitoring sub-frame is 5 ms:

arranging the channel monitoring sub-frame in at least two subframes of the frame structure of the TDD mode.

2. The method of claim 1, wherein arranging a channel monitoring sub-frame for periodically detecting a downlink channel state in a frame structure of the TDD mode comprises at least one of:

arranging the channel monitoring sub-frame in at least one sub-frame of the frame structure of the TDD mode; and arranging the channel monitoring sub-frame in at least two sub-frames of the frame structure of the TDD mode, wherein the at least two sub-frames are of same sub-frame type or different sub-frame types.

3. The method of claim 2, wherein the channel monitoring sub-frame is arranged at one of:

a rear end of an uplink sub-frame adjacent to a downlink sub-frame in the frame structure of the TDD mode, wherein the channel monitoring sub-frame occupies a first predetermined number of symbols ranging from 1 to 14, a front end of a downlink sub-frame adjacent to an uplink sub-frame in the frame structure of the TDD mode, wherein the channel monitoring sub-frame occupies a second predetermined number of symbols ranging from 1 to 14, or a location adjacent to Uplink Pilot Time Slot (UpPTS) in a special sub-frame in the frame structure of the TDD mode, wherein the channel monitoring sub-frame occupies a third predetermined number of symbols ranging from 1 to 9.

4. The method of claim 3, wherein the determining whether a downlink channel is in an idle state comprises:

determining whether the downlink channel is in the idle state in each symbol occupied by the channel monitoring sub-frame;

based on a determination that the downlink channel is in the idle state in each symbol occupied by the channel monitoring sub-frame, determining that the downlink channel is in the idle state; and based on a determination that the downlink channel is not in the idle state in each symbol occupied by the channel monitoring sub-frame, determining that the downlink channel is not in the idle state.

5. The method of claim 3, further comprising:

during the operation of the LTE system, setting at least one of the first predetermined number, the second predetermined number, or the third predetermined number to be one of:

fixed numbers, or non-fixed numbers, based on at least one of:

a channel condition change rate of a first system using the unlicensed frequency band around the LTE system, wherein the channel condition change rate is detected in real time, or channel detecting ability of the first device.

6. The method of claim 5, wherein the channel condition change rate of the first system is in direct proportion to at least one of the first predetermined number, the second predetermined number, or the third predetermined number, and the channel detecting ability of the first device is in inverse proportion to at least one of the first predetermined number, the second predetermined number, or the third predetermined number.

7. The method of claim 1, further comprising:

when there are multiple locations available for arranging the channel monitoring sub-frame in the frame structure of the TDD mode and the period of the channel monitoring sub-frame is M*10 ms, arranging the channel monitoring sub-frame using a first location of the multiple locations.

8. The method of claim 1, further comprising:

during the operation of the LTE system, detecting, in real time, a load state change rate of the LTE system and a load state change rate of a first system using the unlicensed frequency band around the LTE system; and based on the detected load state change rate of the LTE system and the load state change rate of the first system, dynamically setting the period of the channel monitoring sub-frame, wherein the load state change rate of the LTE system is in inverse proportion to the period of the channel monitoring sub-frame and the load state change rate of the first system is in inverse proportion to the period of the channel monitoring sub-frame.

9. The method of claim 1, further comprising:

determining whether a downlink service needs to be processed; and based on a determination that the downlink service needs to be processed, detecting the downlink channel state via the channel monitoring sub-frame in the frame structure of the TDD mode.

10. The method of claim 1, further comprising:

determining whether the first device and a second device belong to the same operator, wherein the second device is configurable as a second base station;

based on a determination that the first device and the second device belong to the same operator, setting a first location of the channel monitoring sub-frame in the frame structure of the TDD mode associated with the first device and a second location of the channel monitoring sub-frame in the frame structure of the TDD mode associated with the second device to be the same on a same carrier frequency; and based on a determination that the first device and the second device belong to different operators, setting the first location and the second location to be different on the same carrier frequency.

11. The method of claim 10, wherein setting the first location and the second location to be different on the same carrier frequency comprises:

determining, on the same carrier frequency, whether a first configuration mode of the frame structure of the TDD mode associated with the first device is the same with a second configuration mode of the frame structure of the TDD mode associated with the second device; and based on a determination that the first configuration mode is the same with the second configuration mode, setting a relative offset between a sub-frame in the frame structure of the TDD mode associated with the first device and a sub-frame of the frame structure of the TDD mode associated with the second device.

12. A system for data transmission, comprising:

a Long Term Evolution (LTE) system operating in an unlicensed frequency band based on a Time Division Duplex (TDD) mode;

a first device configurable as a base station;

a processor; and a memory coupled to the processor, the memory configured to store a set of instructions which when executed by the processor become operational with the processor to:

arrange, by the first device, a channel monitoring sub-frame for periodically detecting a downlink channel state in a frame structure of the TDD mode;

within a period, during the channel monitoring sub-frame, determine whether a downlink channel is in an idle state;

based on a determination that the downlink channel is in the idle state, transmit downlink data via a downlink sub-frame within the period, wherein the downlink sub-frame is located in the frame structure of the TDD mode;

based on a determination that the downlink channel is not in the idle state, not transmit downlink data within the period; and set the period of the channel monitoring sub-frame according to a number of downlink sub-frames included in each switch point period in the frame structure, wherein arranging the channel monitoring sub-frame comprises:

when the period of the channel monitoring sub-frame is M*10 ms,

M being a positive integer:

arranging the channel monitoring sub-frame in at least one subframe of the frame structure of the TDD mode; and when the period of the channel monitoring sub-frame is 5 ms, arranging the channel monitoring sub-frame in at least two subframes of the frame structure of the TDD mode.

13. The system of claim 12, wherein the memory is configured to store a further set of instructions which when executed by the processor become operational with the processor to:

arrange the channel monitoring sub-frame in at least one sub-frame of the frame structure of the TDD mode; or arrange the channel monitoring sub-frame in at least two sub-frames of the frame structure of the TDD mode, wherein the at least two sub-frames are of same sub-frame type or different sub-frame types.

14. The system of claim 13, wherein the memory is configured to store a further set of instructions which when executed by the processor become operational with the processor to arrange the channel monitoring sub-frame at one of:

a rear end of an uplink sub-frame adjacent to a downlink sub-frame in the frame structure of the TDD mode, wherein the channel monitoring sub-frame occupies a first predetermined number of symbols ranging from 1 to 14, a front end of a downlink sub-frame adjacent to an uplink sub-frame in the frame structure of the TDD mode, wherein the channel monitoring sub-frame occupies a second predetermined number of symbols ranging from 1 to 14, or a location adjacent to Uplink Pilot Time Slot (UpPTS) in a special sub-frame in the frame structure of the TDD mode, wherein the channel monitoring sub-frame occupies a third predetermined number of symbols ranging from 1 to 9.

15. The system of claim 14, wherein the instructions stored in the memory when executed by the processor becoming operational to determine whether a downlink channel is in an idle state comprises a further set of instructions which when executed by the processor become operational with the processor to:

determine whether the downlink channel is in the idle state in each symbol occupied by the channel monitoring sub-frame;

based on a determination that the downlink channel is in the idle state in each symbol occupied by the channel monitoring sub-frame, determine that the downlink channel is in the idle state; and based on a determination that the downlink channel is not in the idle state in each symbol occupied by the channel monitoring sub-frame, determine that the downlink channel is not in the idle state.

16. The system of claim 14, wherein the memory is configured to store a further set of instructions which when executed by the processor become operational with the processor to:

during the operation of the LTE system, set the first predetermined number, the second predetermined number, and the third predetermined number to be one of:

fixed numbers, or non-fixed numbers, based on at least one of:

a channel condition change rate of a first system using the unlicensed frequency band around the LTE system, wherein the channel condition change rate is detected in real time, or channel detecting ability of the first device.

17. The system of claim 16, wherein the channel condition change rate of the first system is in direct proportion to the first predetermined number, the second predetermined number, and the third predetermined number, and the channel detecting ability of the first device is in inverse proportion to the first predetermined number, the second predetermined number, and the third predetermined number.

18. A device with base station functions, comprising:

a processor; and a memory coupled to the processor, the memory configured to store a set of instructions which when executed by the processor become operational with the processor to:

arrange a channel monitoring sub-frame for periodically detecting a downlink channel state in a frame structure of a Time Division Duplex (TDD) mode;

within a period, during the channel monitoring sub-frame, determine whether a downlink channel is in an idle state;

based on a determination that the downlink channel is in the idle state, transmit downlink data via a downlink sub-frame within the period, wherein the downlink sub-frame is located in the frame structure of the TDD mode;

based on a determination that the downlink channel is not in the idle state, not transmit downlink data within the period; and set the period of the channel monitoring sub-frame according to a number of downlink sub-frames included in each switch point period in the frame structure, wherein arranging the channel monitoring sub-frame comprises:

when the period of the channel monitoring sub-frame is M*10 ms, M being a positive integer:

arranging the channel monitoring sub-frame in at least one subframe of the frame structure of the TDD mode; and when the period of the channel monitoring sub-frame is 5 ms:

arranging the channel monitoring sub-frame in at least two subframes of the frame structure of the TDD mode.

19. The method of claim 1, wherein the period of the channel monitoring sub-frame has a first length when the number of downlink sub-frames included in each switch point period is a first number, wherein the period of the channel monitoring sub-frame has a second length when the number of downlink sub-frames included in each switch point period is a second number, wherein the first number is larger than the second number, and wherein the first length is less than the second length.

20. The system of claim 12, wherein the period of the channel monitoring sub-frame has a first length when the number of downlink sub-frames included in each switch point period is a first number, wherein the period of the channel monitoring sub-frame has a second length when the number of downlink sub-frames included in each switch point period is a second number, wherein the first number is larger than the second number, and wherein the first length is less than the second length.

* * * * *